US012634937B2

(12) United States Patent (10) Patent No.: US 12,634,937 B2
Shin et al. (45) Date of Patent: May 19, 2026

(54) METHOD AND APPARATUS FOR ALLOCATING RESOURCES THROUGH COOPERATION BETWEEN TERMINALS IN V2X SYSTEM

(71) Applicant: Samsung Electronics Co., Ltd., Suwon-si (KR)

(72) Inventors: Cheolkyu Shin, Suwon-si (KR); Hyunseok Ryu, Suwon-si (KR); Jeongho Yeo, Suwon-si (KR); Sangyeob Jung, Suwon-si (KR); Sungjin Park, Suwon-si (KR); Jonghyun Bang, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

(21) Appl. No.: 17/904,567

(22) PCT Filed: Feb. 22, 2021

(86) PCT No.: PCT/KR2021/002206
§ 371 (c)(1),
(2) Date: Aug. 18, 2022

(87) PCT Pub. No.: WO2021/167427
PCT Pub. Date: Aug. 26, 2021

(65) Prior Publication Data
US 2023/0087401 A1 Mar. 23, 2023

(30) Foreign Application Priority Data
Feb. 20, 2020 (KR) ........................ 10-2020-0021249

(51) Int. Cl.
*H04W 72/20* (2023.01)
*H04L 5/00* (2006.01)

(52) U.S. Cl.
CPC ........... *H04W 72/20* (2023.01); *H04L 5/0035* (2013.01); *H04L 5/0037* (2013.01)

(58) Field of Classification Search
CPC ..... H04W 72/20; H04L 5/0035; H04L 5/0037
See application file for complete search history.

(56) References Cited

U.S. PATENT DOCUMENTS

2019/0082459 A1 3/2019 Faurie et al.
2019/0364554 A1 11/2019 Kuang et al.
(Continued)

FOREIGN PATENT DOCUMENTS

KR 10-2019-0034557 A 4/2019
KR 10-2021-0003648 A 1/2021
(Continued)

OTHER PUBLICATIONS

Supplementary European Search Report dated Apr. 21, 2023, in connection with European Application No. 21756807.0, 9 pages.
(Continued)

*Primary Examiner* — Elton Williams

(57) ABSTRACT

Disclosed are a communication technique for merging, with IoT technology, a 5G communication system for supporting a data transmission rate higher than that of a 4G system, and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. A method for a first terminal of a communication system, according to one embodiment of the present disclosure, comprises the steps of: sharing information about a resource pool with a second terminal; receiving a request for resource allocation information from the second terminal; and transmitting, to the second terminal, resource allocation information indicating
(Continued)

at least one resource related to the resource pool having been shared with the second terminal.

11 Claims, 11 Drawing Sheets

(56)                    References Cited

U.S. PATENT DOCUMENTS

| | | | |
|---|---|---|---|
| 2020/0195389 A1 | 6/2020 | Basu Mallick et al. | |
| 2020/0383088 A1 | 12/2020 | Min et al. | |
| 2021/0176669 A1* | 6/2021 | Fakoorian | H04W 72/20 |
| 2021/0204250 A1* | 7/2021 | Ashraf | H04W 4/40 |
| 2021/0306828 A1* | 9/2021 | Panteleev | H04W 72/0446 |

FOREIGN PATENT DOCUMENTS

| | | |
|---|---|---|
| WO | 2019031900 A1 | 2/2019 |
| WO | 2019192701 A1 | 10/2019 |
| WO | 2020022752 A1 | 1/2020 |
| WO | 2020028662 A1 | 2/2020 |
| WO | 2020033088 A1 | 2/2020 |
| WO | 2020033628 A1 | 2/2020 |

OTHER PUBLICATIONS

International Search Report and Written Opinion of the International Searching Authority dated Jun. 4, 2021, in connection with International Application No. PCT/KR2021/002206, 8 pages.
Huawei et al., "Handling of multiple resource pools for NR sidelink mode-2," R2-2000713, 3GPP TSG-RAN WG2 Meeting #109 electronic, Feb. 24-Mar. 6, 2020, 3 pages.
Samsung, "On Simultaneous Configuration of Mode 1 and Mode 2," R1-1912461, 3GPP TSG RAN WG1 #98bis, Chongqing, China, Oct. 14-20, 2019, 4 pages.
Notice of Reasons for Refusal issued Jan. 28, 2025, in connection with Japanese Patent Application No. 2022-550010, 5 pages.
Office Action issued Apr. 9, 2025, in connection with Korean Patent Application No. 10-2020-0021249, 7 pages.
Communication pursuant to Article 94(3) EPC dated Apr. 17, 2025, in connection with European Patent Application No. 21756807.0, 9 pages.
Vivo, "Discussion on mode 2 resource allocation mechanism," R1-1906139, 3GPP TSG RAN WG1 #97, Reno, USA, May 13-17, 2019, 13 pages.
ZTE et al., "Mode 2 resource allocation schemes on sidelink," R1-1912553, 3GPP TSG RAN WG1 #99, Reno, Nevada, US, Nov. 18-22, 2019, 12 pages.
Notice of Reasons for Refusal dated Jun. 17, 2025, in connection with Japanese Application No. 2022-550010, 4 pages.

* cited by examiner (a) In – coverage Scenario        (b) Partial coverage Scenario (c) Out – of – coverage Scenario (d) Intel – cell V2X Communication Scenario (a) Unicast V2X Communication (b) Groupcast V2X Communication

FIG. 8

METHOD AND APPARATUS FOR ALLOCATING RESOURCES THROUGH COOPERATION BETWEEN TERMINALS IN V2X SYSTEM

CROSS-REFERENCE TO RELATED APPLICATIONS

This application is a 371 of International Application No. PCT/KR2021/002206, filed Feb. 22, 2021, which claims priority to Korean Patent Application No. 10-2020-0021249, filed Feb. 20, 2020, the disclosures of which are herein incorporated by reference in their entirety.

BACKGROUND

1. Field

The disclosure relates to a wireless mobile communication system and, in particular, to a method and apparatus for performing resource allocation through cooperation between terminals in a process that a vehicle terminal supporting vehicle-to-everything (V2X) transmits and receives information with another vehicle terminal and a pedestrian portable terminal through a sidelink.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in extremely high frequency (mmWave) bands, e.g., 60 GHz band, so as to accomplish higher data rates. To decrease propagation loss of the radio waves and increase the transmission distance, the beam-forming, massive multiple-input multiple-output (massive MIMO), full dimensional MIMO (FD-MIMO), array antenna, an analog beamforming, large scale antenna techniques, etc. have been discussed and adopted in the 5G communication system. In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

SUMMARY

The disclosure relates to a wireless communication system and to a method and apparatus for selecting transmission resources through cooperation between terminals in a process that a vehicle terminal supporting V2X exchanges information with another vehicle terminal and a pedestrian portable terminal through a sidelink. Specifically, the disclosure relates to a method for exchanging information for cooperation between terminals, a method for allocating sidelink transmission resources through this method, and operations of a base station and a terminal therefor.

According to an embodiment of the disclosure for solving the above problems, a method of a first terminal in a wireless communication system may include sharing information on a resource pool with a second terminal; receiving a request for resource allocation information from the second terminal; and transmitting the resource allocation information indicating at least one resource related to the resource pool shared with the second terminal to the second terminal.

According to an embodiment, the method may further include, in case of sharing a plurality of resource pools with the second terminal, transmitting information for indicating at least one resource pool among the plurality of resource pools to the second terminal, and the at least one resource pool among the plurality of resource pools may be determined based on a channel busy ratio (CBR).

According to an embodiment, the method may further include receiving information on at least one of priority, remaining packet delay budget, buffer state report, HARQ feedback enabled/disabled, and the number of consecutive sub-channels in frequency from the second terminal, and the resource allocation information may be determined based on the information received from the second terminal.

According to an embodiment, the resource allocation information may include location information of an initial resource and location information of a retransmission resource for at least one transport block.

According to an embodiment of the disclosure, a method of a second terminal in a wireless communication system may include sharing information on a resource pool with a first terminal; transmitting a request for resource allocation information to the first terminal; and receiving the resource allocation information indicating at least one resource related to the resource pool shared with the first terminal to the first terminal.

According to an embodiment of the disclosure, a first terminal in a wireless communication system may include a transceiver; and a controller configured to share information on a resource pool with a second terminal, to receive a request for resource allocation information from the second terminal, and to transmit the resource allocation information indicating at least one resource related to the resource pool shared with the second terminal to the second terminal.

According to an embodiment of the disclosure, a second terminal in a wireless communication system may include a transceiver; and a controller configured to share information on a resource pool with a first terminal, to transmit a request for resource allocation information to the first terminal, and to receive the resource allocation information indicating at least one resource related to the resource pool shared with the first terminal to the first terminal.

The present disclosure proposes a procedure for a terminal to perform resource allocation in sidelink communication. Through the proposed method, the performance of resource allocation can be improved. In addition, it can be effectively used to minimize the power consumption of the terminal.

BRIEF DESCRIPTION OF THE DRAWINGS

FIG. 8 is a diagram defining a sensing widow and a resource selection widow required for UE-A to perform resource (re)selection and re-evaluation for resource allocation of UE-B according to an embodiment of the disclosure.

DETAILED DESCRIPTION

Figure 1:
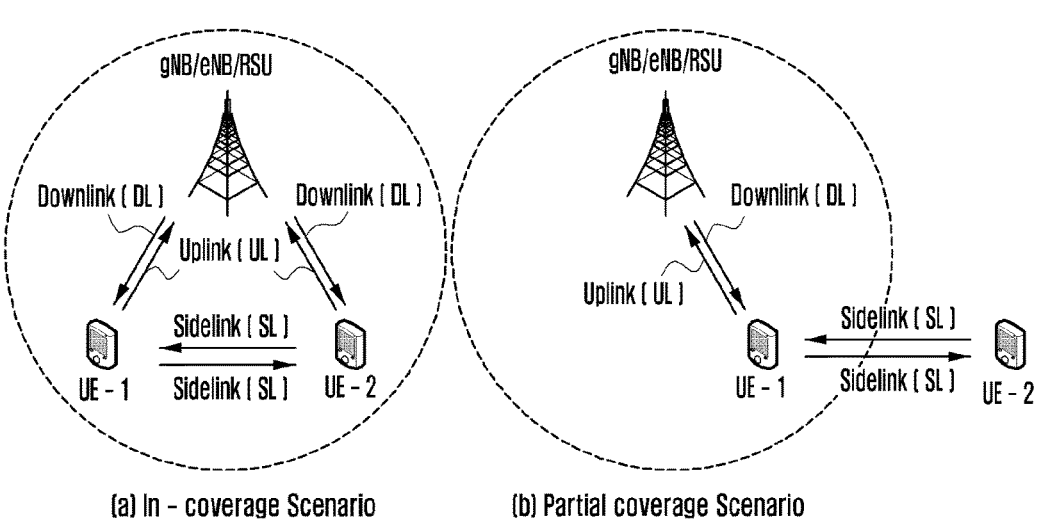
FIG. 1 is a diagram illustrating a system according to embodiments of the disclosure.
Figure 1:
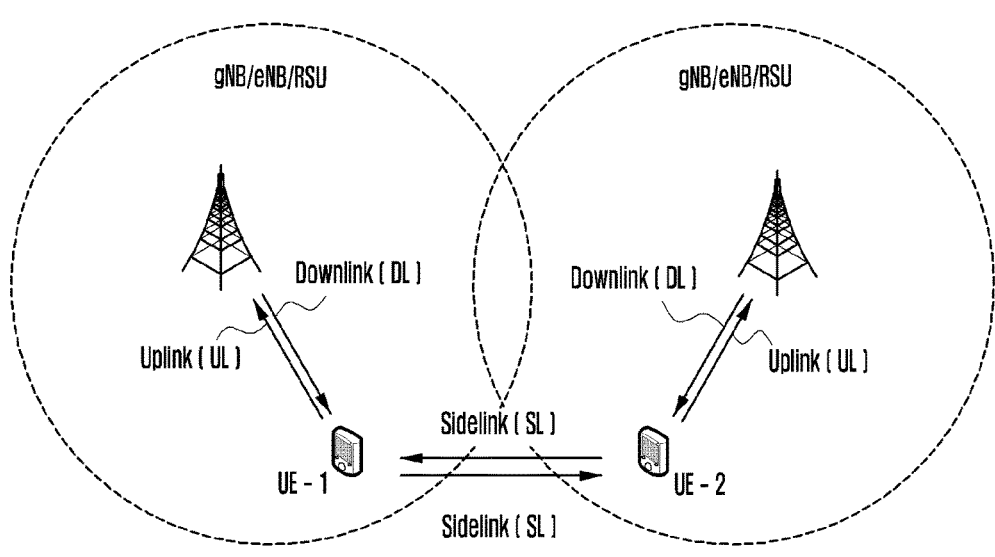

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

Embodiments of the disclosure will be described herein focusing a wireless access network, i.e., new radio (NR), and a packet core, i.e., a 5G system, a 5G core network, or a next generation (NG) core, according to the 5G mobile communication standard specified by the 3rd generation partnership project (3GPP) which is a mobile communication standardization organization. However, the subject matter of the disclosure can be also applied to other communication systems having similar technical backgrounds through slight modification without departing from the scope of the disclosure as being apparent to those skilled in the art.

In the 5G system, a network data collection and analysis function (NWDAF), which is a network function of collecting, analyzing, and providing data in the 5G network, may be defined so as to support network automation. The NWDAF may collect information from the 5G network, store and analyze the collected information, and provide a result of analysis to an unspecified network function (NF). The result of analysis may be used independently in each NF.

Some terms and names defined in the 3GPP standards (e.g., 5G, NR, LTE, or similar system standards) will be used for the convenience of description. However, the disclosure is not limited by such terms and names, and may be also applied to any other system that complies with any other standard.

Further, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

To meet the demand for wireless data traffic having increased since deployment of 4G communication systems, efforts have been made to develop an improved 5G communication system (NR, new radio). To accomplish higher data rates, the 5G communication system is designed to enable resources in extremely high frequency (mmWave) bands (e.g., 28 GHz frequency band). To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, unlike the LTE, the 5G communication system supports various subcarrier spacings such as 15 kHz, 30 kHz, 60 kHz, and 120 kHz, uses a polar coding for a physical control channel, and uses a low density parity check (LDPC) for a physical data channel. Besides, CP-OFDM as well as DFT-S-OFDM are used as a waveform for uplink transmission. The LTE supports hybrid ARQ (HARQ) retransmission in units of a transport block (TB), whereas the 5G can additionally support HARQ retransmission based on a code block group (CBG) in which a plurality of code blocks (CBs) are bundled.

Furthermore, in the 5G communication system, development for system network improvement is under way based on an advanced small cell, a cloud radio access network (cloud RAN), an ultra-dense network, device-to-device (D2D) communication, wireless backhaul, a vehicle-to-everything (V2X) network, cooperative communication, coordinated multi-points (CoMP), reception-end interference cancellation, and the like.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology. As such, a great variety of services may be provided to users in the communication system. In order to provide such services to users, a method and apparatus for providing respective services within the same time interval are required. One of such services provided in the 5G communication system is a service that satisfies requirements of low latency and high reliability.

In case of a vehicular communication, the NR V2X system supports unicast communication, groupcast (or multicast) communication, and broadcast communication between UEs. In addition, unlike the LTE V2X that aims to transmit and receive basic safety information required for road driving of a vehicle, the NR V2X aims to provide more advanced services such as platooning, advanced driving, extended sensors, and remote driving. In addition, the NR V2X system supports a method in which the UE directly allocates a sidelink transmission resource through sensing in consideration of both periodic and aperiodic traffic. In this case, a method of receiving resource allocation related information from another UE may be considered. By receiving the resource allocation related information from another UE, performance improvement of resource selection can be expected and power consumption of the UE can be reduced. As an example, the base station can receive reports on the congestion of channels such as a channel busy ratio (CBR)

from UEs located within the coverage, and thus, if the UE is located within the coverage of the base station, a resource pool defined as a set of resources in time and frequency domains used for sidelink transmission and reception can be better configured from the base station. Therefore, a UE located outside the coverage of the base station can expect an improvement in resource selection performance when receiving the resource allocation related information from a UE within the coverage of the base station, rather than selecting a resource from a preconfigured resource pool. As another example, in case of supporting an advanced service such as platooning in the sidelink, a scenario in which a leader node of a group connected for platooning provides resource allocation related information for the purpose of controlling one specific node or simultaneously controlling a group consisting of a plurality of specific nodes can be considered. In this case, the performance improvement of platooning can be expected when the leader node identifies the group status and provides the resource allocation related information rather than each node in the group individually selects a resource. In addition, because a lot of power is consumed for the UE to perform sensing to select a sidelink transmission resource, power consumption of the UE can be minimized if another UE performs resource allocation instead. In particular, in case of a pedestrian's portable UE, a method and procedure for selecting a transmission resource by minimizing the power consumption of the UE may be required. Therefore, the operations of the UE and the base station to provide such a solution should be defined. However, there is no discussion related to this. Accordingly, the disclosure proposes a method for performing inter-UE coordination in order to receive resource allocation related information from another UE.

Embodiments of the disclosure have been proposed to support the above-described scenario and, in particular, are to provide a method and an apparatus for a procedure (Mode2) in which a UE performs sensing and resource allocation in a sidelink. In addition, a Mode2 method for minimizing power consumption of the UE is proposed.

FIG. 1 is a diagram illustrating a system according to embodiments of the disclosure.

In FIG. 1, (a) shows an in-coverage (IC) scenario in which all V2X UEs (UE-1 and UE-2) are located within the coverage of a base station. All the V2X UEs are capable of receiving data and control information from the base station through a downlink (DL) or transmitting data and control information to the base station through an uplink (UL). Such data and control information may be available for V2X communication or for general cellular communication. In addition, the V2X UEs are capable of transmitting/receiving data and control information for V2X communication through a sidelink (SL).

In FIG. 1, (b) shows a scenario in which, among V2X UEs, UE-1 is located within the coverage of the base station and UE-2 is located outside the coverage of the base station. That is, (b) of FIG. 1 shows a partial coverage (PC) scenario in which a certain V2X UE (UE-2) is located out of the coverage of the base station. The V2X UE-1 located within the coverage of the base station is capable of receiving data and control information from the base station through the downlink or transmitting data and control information to the base station through the uplink. The V2X UE-2 located out of the coverage of the base station is incapable of receiving data and control information from the base station through the downlink and incapable of transmitting data and control information to the base station through the uplink. The V2X UE-2 is capable of transmitting/receiving data and control information for V2X communication to/from the UE-1 through the sidelink.

In FIG. 1, (c) shows an out-of-coverage (OOC) scenario in which all V2X UEs are located out of the coverage of the base station. Therefore, the V2X UEs (UE-1 and UE-2) are incapable of receiving data and control information from the base station through the downlink and incapable of transmitting data and control information to the base station through the uplink. The V2X UEs (UE-1 and UE-2) are capable of transmitting/receiving data and control information for V2X communication through the sidelink.

In FIG. 1, (d) shows an inter-cell scenario in which V2X UEs (UE-1 and UE-2) located in different cells perform V2X communication with each other. Specifically, (d) of FIG. 1 shows a case where the V2X UEs (UE-1 and UE-2) are connected to different base stations (an RRC connected state) or are camping on (an RRC connection released state, i.e., an RRC idle state). In this scenario, the V2X UE-1 may be a V2X transmitting UE, and the V2X UE-2 may be a V2X receiving UE. Alternatively, the V2X UE-1 may be the V2X receiving UE, and the V2X UE-2 may be the V2X transmitting UE. The V2X UE-1 may receive a system information block (SIB) from a base station which the V2X UE-1 is connected to (or is camping on), and the V2X UE-2 may receive the SIB from another base station which the V2X UE-2 is connected to (is camping on). In this case, as the SIB, an existing SIB or an SIB defined separately for V2X may be used. In addition, information of the SIB received by the V2X UE-1 and information of the SIB received by the V2X UE-2 may be different from each other. Therefore, to enable V2X communication between UEs (UE-1 and UE-2) located in different cells, information needs to be unified, or a method of interpreting SIB information transmitted from the other cell through signaling of information may be additionally required.

Although FIG. 1 illustrates a V2X system composed of two V2X UEs (UE-1 and UE-2) for convenience of description, this is not a limitation and communication between more V2X UEs may be performed. In addition, an interface (an uplink and a downlink) between a base station and a V2X UE may be referred to as a Uu interface, and a sidelink between V2X UEs may be referred to as a PC5 interface. Therefore, in the disclosure, the above terms may be used interchangeably. Meanwhile, in the disclosure, the UE may include a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, or a vehicle that supports vehicle-to-infrastructure (V2I) communication. In addition, the UE may include a road side unit (RSU) having a UE function, an RSU having a base station function, or an RSU having a part of the base station function and a part of the UE function.

In addition, according to an embodiment of the disclosure, a base station may be a base station that supports both V2X communication and general cellular communication, or a base station that supports only V2X communication. The base station may be a 5G base station (gNB), a 4G base station (eNB), or an RSU. Therefore, in the disclosure, the base station may be referred to as the RSU.

Figure 2:
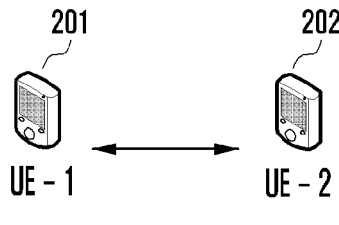
FIG. 2 is a diagram illustrating a V2X communication method performed through a sidelink according to an embodiment of the disclosure.
Figure 2:
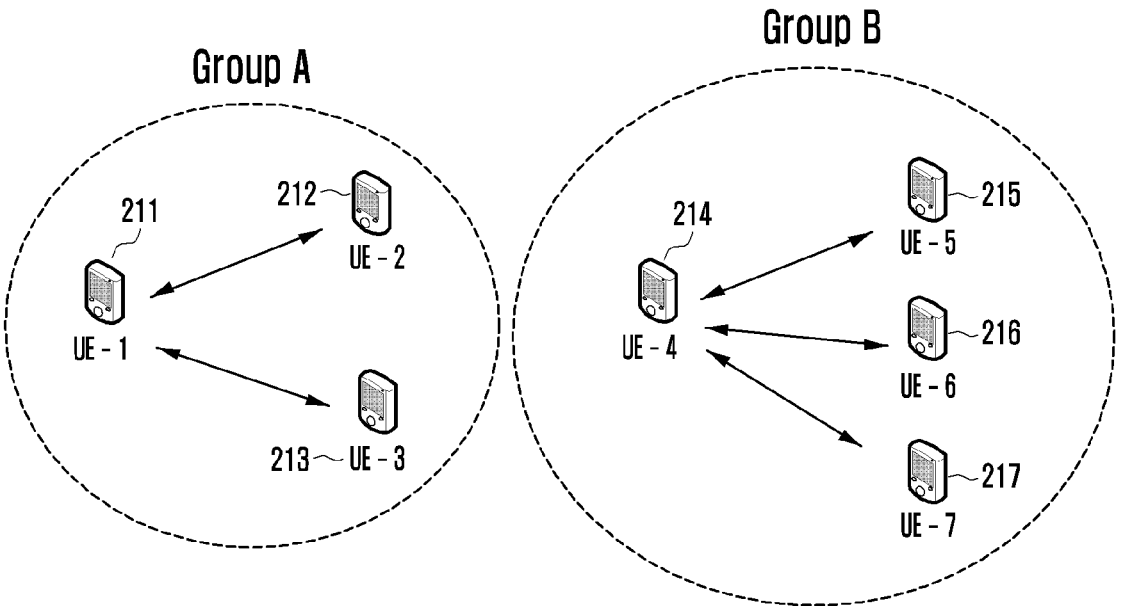

FIG. 2 is a diagram illustrating a V2X communication method performed through a sidelink according to an embodiment of the disclosure.

With reference to (a) of FIG. 2, a UE-1 201 (e.g., a TX UE) and a UE-2 202 (e.g., an RX UE) may perform one-to-one communication, which may be referred to as unicast communication.

With reference to (b) of FIG. 2, TX UEs and RX UEs may perform one-to-many communication, which may be referred to as groupcast or multicast communication. In (b) of FIG. 2, a UE-1 211, a UE-2 212, and a UE-3 213 form one group (group A) and perform groupcast communication, and a UE-4 214, a UE-5 215, a UE-6 216, and a UE-7 217 form another group (group B) and perform groupcast communication. Each UE performs groupcast communication only within a group to which it belongs, and communication between groups may be performed via unicast, groupcast, or broadcast communication. Although (b) of FIG. 2 illustrates two groups (group A and group B), this is not a limitation.

Although not shown in FIG. 2, V2X UEs may perform broadcast communication. The broadcast communication refers to a case where all V2X UEs receive data and control information transmitted by a V2X transmitting UE through a sidelink. For example, in (b) of FIG. 2, assuming that the UE-1 211 is a transmitting UE for broadcast, all the other UEs (the UE-2 212, the UE-3 213, the UE-4 214, the UE-5 215, the UE-6 216, and the UE-7 217) can receive data and control information transmitted by the UE-1 211.

Unlike the LTE V2X, the NR V2X may consider supporting a form in which a vehicle UE transmits data to only one specific node through unicast and a form in which a vehicle UE transmits data to a specific number of nodes through groupcast. For example, these unicast and groupcast technologies can be usefully used in a service scenario such as platooning, which is a technology for moving two or more vehicles connected in a single network in a cluster form. Specifically, unicast communication may be required for a leader node of a group connected by platooning to control one specific node, and groupcast communication may be required for simultaneously controlling a group composed of a number of specific nodes.

Figure 3:
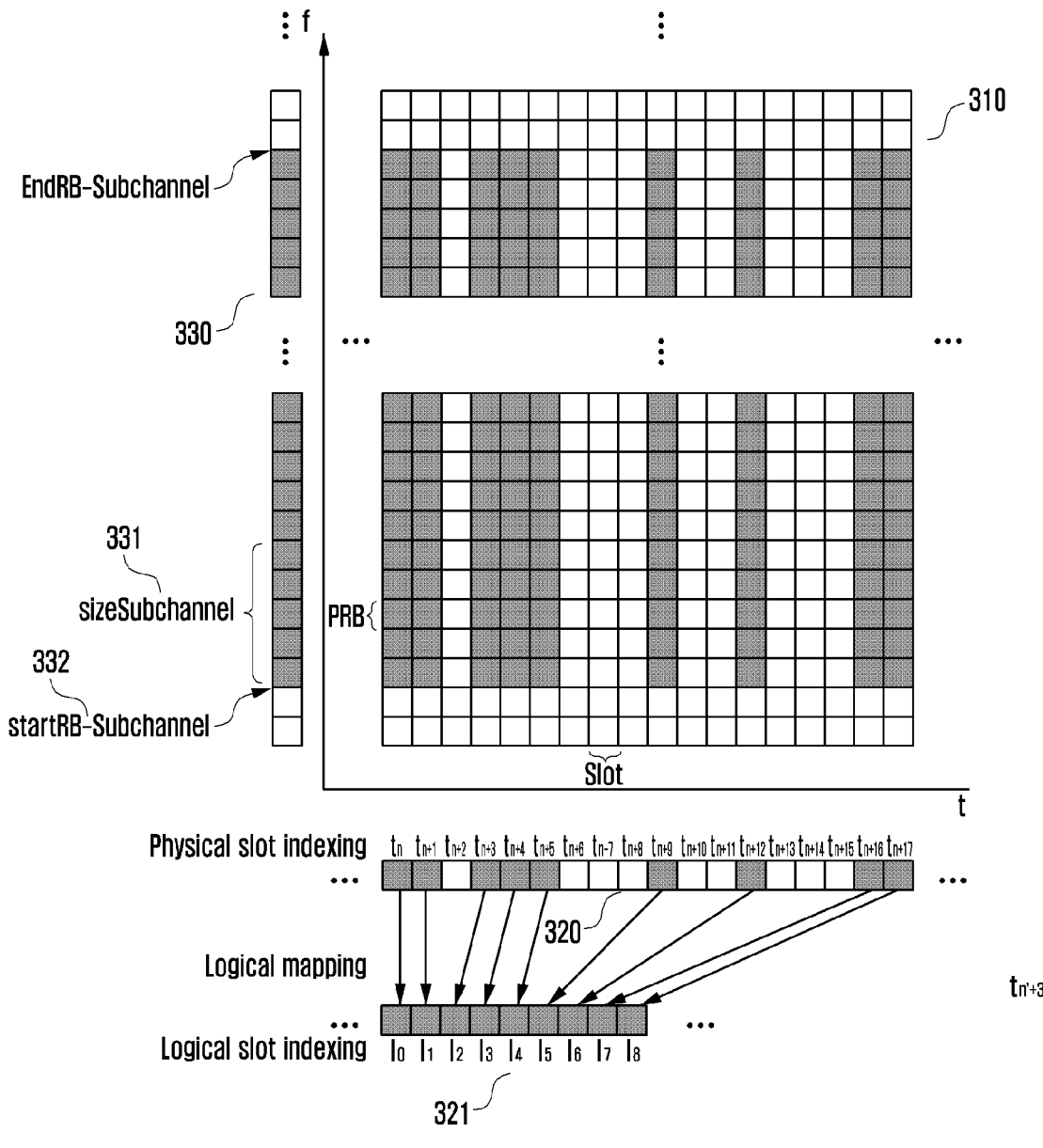
FIG. 3 is a diagram illustrating a resource pool defined as a set of resources in time and frequency domains used for sidelink transmission and reception according to an embodiment of the disclosure.

FIG. 3 is a diagram illustrating a resource pool defined as a set of resources in time and frequency domains used for sidelink transmission and reception according to an embodiment of the disclosure.

In the resource pool, a resource granularity of the time axis may be a slot. In addition, a resource granularity of the frequency axis may be a sub-channel composed of one or more physical resource blocks (PRBs).

In case 310 that the resource pool is allocated in time and frequency domains, a colored region indicates a region configured as the resource pool in time and frequency domains. Although the disclosure describes an example in which the resource pool is discontinuously allocated in time domain, the resource pool may also be continuously allocated in time domain. In addition, although the disclosure describes an example in which the resource pool is continuously allocated in frequency domain, a method of discontinuously allocating the resource pool in frequency domain is not excluded.

With reference to FIG. 3, a case 320 that the resource pool is discontinuously allocated in time domain is illustrated. With reference to FIG. 3, shown is a case in which the granularity of time domain resource allocation is a slot. Specifically, one slot composed of a plurality of OFDM symbols may be a basic unit of resource allocation on the time axis. In this case, all OFDM symbols constituting the slot may be used for sidelink transmission, or some of OFDM symbols constituting the slot may be used for sidelink transmission. For example, a part of the slot may be used for the downlink/uplink used as the Uu interface between the base station and the UE. With reference to FIG. 3, a colored slot indicates a slot included in a resource pool based on time, and this slot allocated to the resource pool may be (pre-)configured with resource pool information in time domain. For example, the time domain resource pool information may be indicated by a bitmap through the SIB.

With reference to FIG. 3, a physical slot 320 belonging to a resource pool that is non-contiguous in time domain may be mapped to a logical slot 321. In general, a set of slots belonging to a physical sidelink shared channel (PSSCH) resource pool may be represented by (t0, t1, . . . ti, . . . , tTmax).

With reference to FIG. 3, a case 330 that the resource pool is continuously allocated in frequency domain is illustrated.

Resource allocation on the frequency axis may be performed in units of sub-channel 331. The sub-channel 331 may be defined as the granularity of frequency domain resource allocation composed of one or more RBs. That is, the sub-channel 331 may be defined as an integer multiple of RB. With reference to FIG. 3, the sub-channel 331 may be composed of five consecutive PRBs, and the size of the sub-channel (sizeSubchannel) may be the size of five consecutive PRBs. However, shown in the drawings is only an example of the disclosure, and the size of the sub-channel may be configured differently. Also, it is common, but not always, that one sub-channel is composed of consecutive PRBs. The sub-channel 331 may be a basic unit of resource allocation for the PSSCH.

The startRB-Subchannel 332 may indicate a start position of the sub-channel 331 on the frequency axis in the resource pool. In case that the resource allocation is performed in units of sub-channels 331 on the frequency axis, resources may be allocated in frequency domain through configuration information on the RB index (startRB-Subchannel, 332) for start of the sub-channel 331, the number (sizeSubchannel) of RBs constituting the sub-channel 331, and the total number (numSubchannel) of sub-channels 331, etc. In this case, information on startRB-Subchannel, sizeSubchannel, and numSubchannel may be (pre-)configured as frequency domain resource pool information. For example, the frequency domain resource pool information may be configured and indicated through the SIB.

Figure 4:
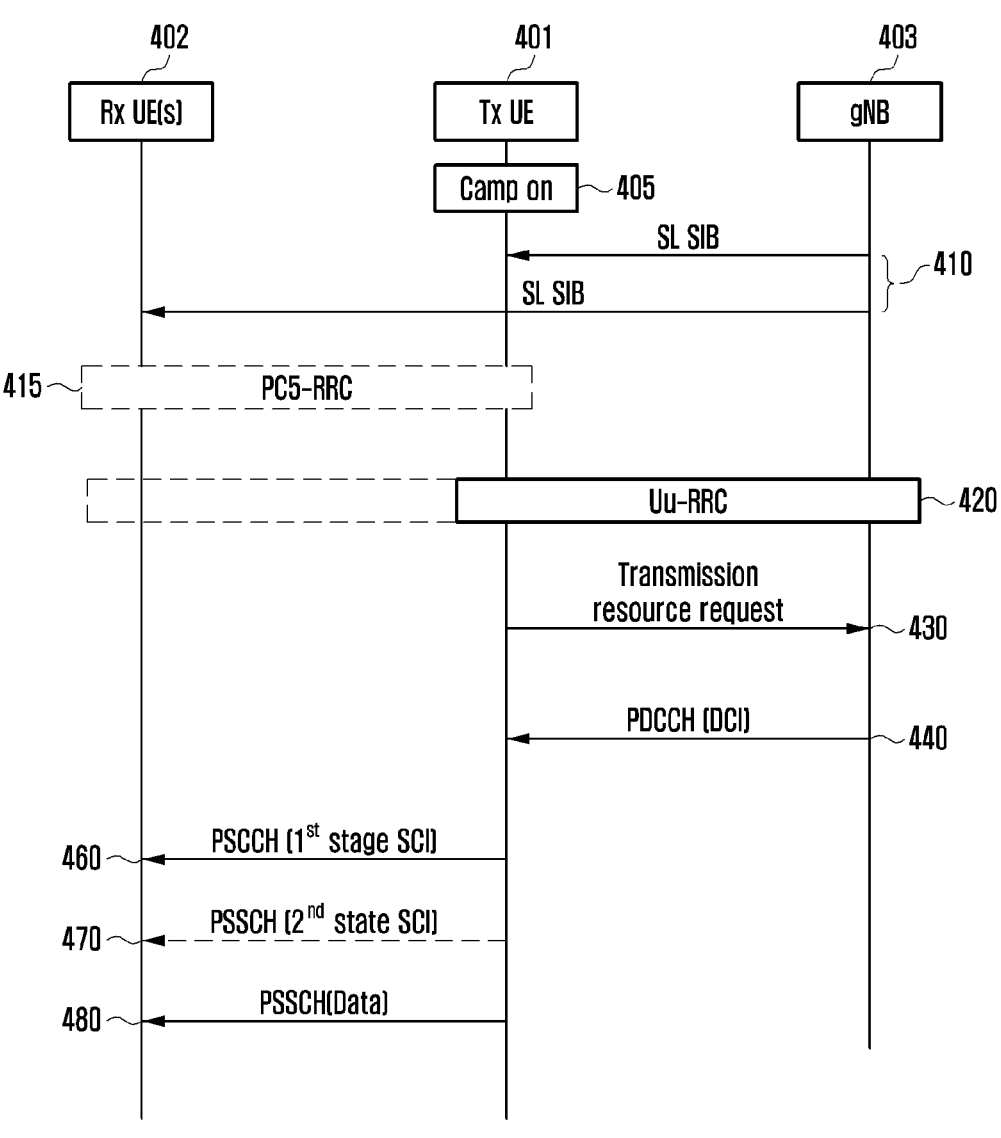
FIG. 4 is a diagram illustrating a method for a base station to allocate a transmission resource in a sidelink according to an embodiment of the disclosure.

FIG. 4 is a diagram illustrating a method for a base station to allocate a transmission resource in a sidelink according to an embodiment of the disclosure.

The method for the base station to allocate the transmission resource in the sidelink will be referred to as Mode 1 hereinafter. Mode 1 may be a scheduled resource allocation. Mode 1 may indicate a method in which the base station allocates resources used for sidelink transmission to RRC-connected UEs in a dedicated scheduling scheme. The method of Mode 1 can be effective for interference management and resource pool management because the base station can manage sidelink resources.

With reference to FIG. 4, a transmitting UE 401, which is camping on (405), and a receiving UE 402 may receive a sidelink system information block (SL-SIB) from a base station (gNB) 403 (step 410). Here, the receiving UE 402 indicates a UE receiving data transmitted by the transmitting UE 401. The SL-SIB information may include sidelink resource pool information for sidelink transmission/reception, parameter configuration information for sensing operation, information for configuring sidelink synchronization, or carrier information for sidelink transmission/reception operating at different frequencies.

When data traffic for V2X is generated in the transmitting UE 401, the transmitting UE 401 may be RRC-connected to the gNB 403 (step 420). Here, the RRC connection between the UE and the gNB may be referred to as Uu-RRC. The Uu-RRC connection process 420 may be performed before the data traffic generation of the transmitting UE 401. Also, in Mode 1, in a state where the Uu-RRC connection process 420 between the gNB 403 and the receiving UE 402 is performed, the transmitting UE may perform transmission to the receiving UE via the sidelink. Contrary to this, in Mode 1, the transmitting UE can perform transmission to the receiving UE through the sidelink even in a state where the Uu-RRC connection process 420 between the gNB 403 and the receiving UE 402 is not performed.

The transmitting UE 401 may request a transmission resource capable of performing V2X communication with the receiving UE 402 from the gNB 403 (step 430). At this time, using a physical uplink control channel (PUCCH), an RRC message, or a MAC CE, the transmitting UE 401 may request a sidelink transmission resource from the gNB 403. The MAC CE may be a buffer status report (BSR) MAC CE of a new format (including at least an indicator indicating the BSR for V2X communication and information on the size of data buffered for D2D communication). Also, the transmitting UE 401 may request a sidelink resource through a scheduling request (SR) bit transmitted through the physical uplink control channel.

Next, the gNB 403 may allocate a V2X transmission resource to the transmission UE 401. At this time, the gNB may allocate the transmission resource in a dynamic grant or configured grant scheme.

First, in case of the dynamic grant scheme, the gNB may allocate a resource for TB transmission through downlink control information (DCI). Sidelink scheduling information contained in the DCI may include parameters related to transmission occasion and frequency allocation location information fields of initial transmission and retransmission. The DCI for the dynamic grant scheme may include a cyclic redundancy check (CRC) scrambled with SL-V-RNTI to indicate the dynamic grant scheme.

Next, in case of the configured grant scheme, the gNB may periodically allocate resources for TB transmission by configuring a semi-persistent scheduling (SPS) interval through Uu-RRC. In this case, the gNB may allocate resources for one TB through the DCI. The sidelink scheduling information for one TB contained in the DCI may include parameters related to transmission occasion and frequency allocation location information of initial transmission and retransmission resources. In case that resources are allocated in the configured grant scheme, the transmission occasion and frequency allocation location of the initial transmission and retransmission for one TB can be determined by the DCI, and the resource for the next TB may be repeated at the SPS interval configured through Uu-RRC. The DCI for the configured grant scheme may include a CRC scrambled with SL-SPS-V-RNTI to indicate the configured grant scheme. In addition, the configured grant (CG) scheme may be divided into type1 CG and type2 CG. In case of Type2 CG, it is possible to activate/deactivate a resource configured with the configured grant through the DCI.

Therefore, in case of Mode 1, the gNB 403 may instruct the transmitting UE 401 to schedule for sidelink communication with the receiving UE 402 through DCI transmission via the PDCCH (step 440).

In case of broadcast transmission, the transmitting UE 401 may broadcast the SCI (1st stage) to the receiving UE 402 through the PSCCH without RRC setup 415 for the sidelink (step 460). Also, the transmitting UE 401 may broadcast data to the receiving UE 402 through the PSSCH (step 480). In case of broadcast transmission, SCI transmission (2nd stage SCI, 470) through the PSSCH may not be performed.

Contrary to this, in case of unicast or groupcast transmission, the transmitting UE 401 may perform RRC connection with another terminal on a one-to-one basis. Here, the RRC connection between UEs may be referred to as PC5-RRC 415 to be distinguished from Uu-RRC. Even in case of groupcast, the PC5-RRC 415 may be individually connected between UEs in a group. With reference to FIG. 4, although the connection of the PC5-RRC 415 is shown as an operation after the transmission 410 of the SL-SIB, it may be performed at any time before the transmission 410 of the SL-SIB or before the transmission of the SCI. If RRC connection between UEs is required, sidelink PC5-RRC connection is performed, and the transmitting UE 401 may transmit the 1st stage SCI to the receiving UE 402 through the PSCCH in unicast or groupcast (step 460). In this case, the groupcast transmission of the SCI may be interpreted as group SCI. In addition, the transmitting UE 401 may transmit the 2nd stage SCI to the receiving UE 402 through the PSSCH in unicast or groupcast (step 470). In this case, information related to resource allocation may be included in the 1st stage SCI, and other control information may be included in the 2nd stage SCI. In addition, the transmitting UE 401 may transmit data to the receiving UE 402 through the PSSCH in unicast or groupcast (step 480).

Figure 5:
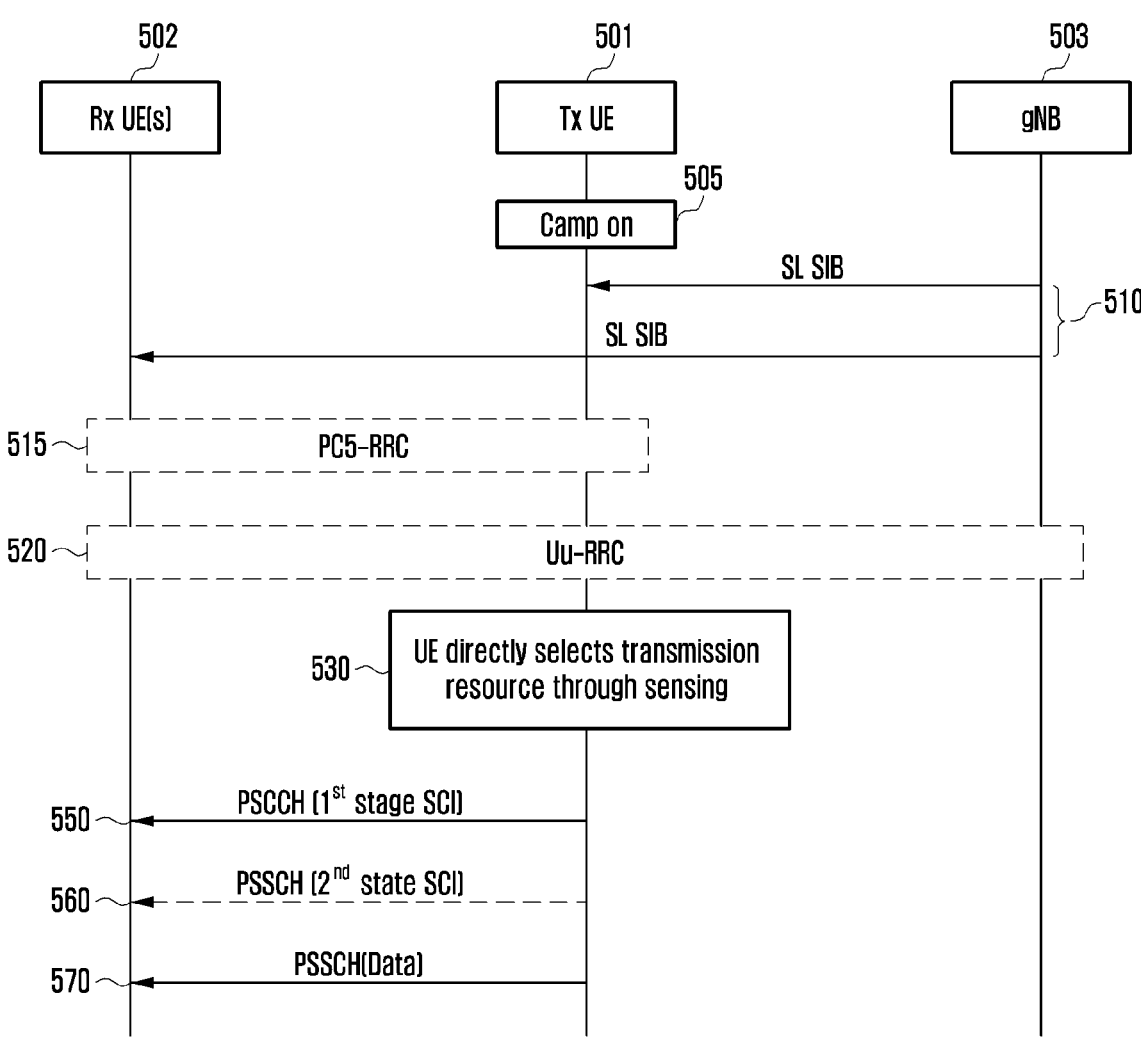
FIG. 5 is a diagram illustrating a method for a UE to directly allocate a sidelink transmission resource through sensing in a sidelink according to an embodiment of the disclosure.

FIG. 5 is a diagram illustrating a method for a UE to directly allocate a sidelink transmission resource through sensing in a sidelink according to an embodiment of the disclosure. Hereinafter, a method for the UE to directly allocate the sidelink transmission resource through sensing in the sidelink will be referred to as Mode 2. In case of Mode 2, it may also be referred to as UE autonomous resource selection. In Mode 2, a base station (gNB) 503 may provide a sidelink transmission/reception resource pool for V2X as system information, and a transmitting UE 501 may select a transmission resource in accordance with a predetermined rule. Unlike Mode 1 in which the gNB directly participates in resource allocation, there is a difference in FIG. 5 in that the transmitting UE 501 autonomously selects resources and transmits data based on a resource pool previously received through the system information.

With reference to FIG. 5, the transmitting UE 501, which is camping on (505), and a receiving UE 502 may receive a SL-SIB from the gNB 503 (step 510). Here, the receiving UE 502 indicates a UE receiving data transmitted by the transmitting UE 501. The SL-SIB information may include sidelink resource pool information for sidelink transmission/reception, parameter configuration information for sensing operation, information for configuring sidelink synchronization, or carrier information for sidelink transmission/reception operating at different frequencies.

A difference between FIG. 4 and FIG. 5 is that in FIG. 4 the gNB 503 and the transmitting UE 501 operate in an RRC connected state, whereas in FIG. 5 the transmitting UE 501 may operate even in an idle mode 520 (in a state where RRC is not connected). Also, even in the RRC connected state 520, the gNB 503 does not directly participate in resource allocation and may allow the transmitting UE 501 to autonomously select a transmission resource. Here, the RRC connection between the transmitting UE 501 and the gNB 503 may be referred to as Uu-RRC 520. When data traffic for V2X is generated in the transmitting UE 501, the transmitting UE 501 may be configured with a resource pool through the system information received from the gNB 503, and the transmitting UE 501 may directly select a resource in the time/frequency domain through sensing within the configured resource pool (step 530).

In case of broadcast transmission, the transmitting UE 501 may broadcast the SCI (1st stage) to the receiving UE 502 through the PSCCH without RRC setup 515 for the sidelink (step 550). Also, the transmitting UE 501 may broadcast data to the receiving UE 502 through the PSSCH (step 570). In case of broadcast transmission, SCI transmission (2nd stage SCI, 560) through the PSSCH may not be performed.

Contrary to this, in case of unicast or groupcast transmission, the transmitting UE 501 may perform RRC connection with another terminal on a one-to-one basis. Here, the RRC connection between UEs may be referred to as PC5-RRC 515 to be distinguished from Uu-RRC. Even in case of groupcast, the PC5-RRC may be individually connected between UEs in a group. Although in FIG. 5 the connection of the PC5-RRC 515 is shown as an operation after the transmission 510 of the SL-SIB, it may be performed at any time before the transmission 510 of the SL-SIB or before the transmission 550 of the SCI. If RRC connection between UEs is required, sidelink PC5-RRC connection 515 is performed, and the transmitting UE 501 may transmit the 1st stage SCI to the receiving UE 502 through the PSCCH in unicast or groupcast (step 550). In this case, the groupcast transmission of the SCI may be interpreted as group SCI. In addition, the transmitting UE 501 may transmit the 2nd stage SCI to the receiving UE 502 through the PSSCH in unicast or groupcast (step 560). In this case, information related to resource allocation may be included in the 1st stage SCI, and other control information may be included in the 2nd stage SCI. In addition, the transmitting UE 501 may transmit data to the receiving UE 502 through the PSSCH in unicast or groupcast (step 570).

Figure 6:
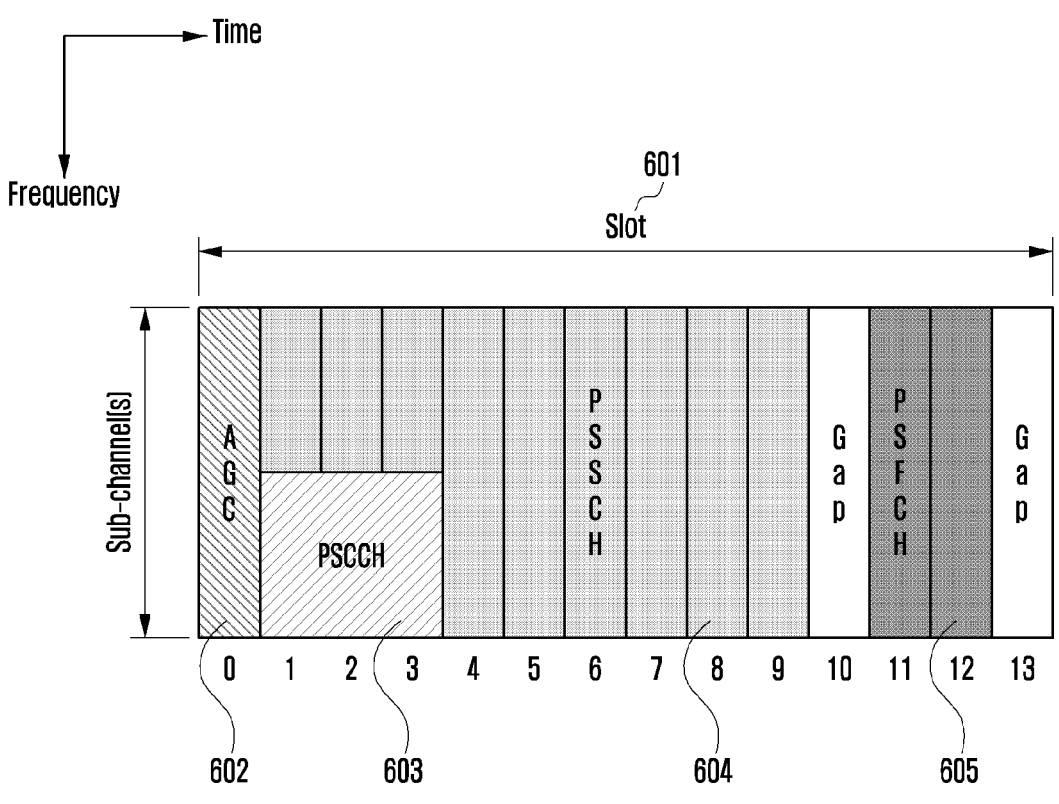
FIG. 6 is a diagram illustrating a mapping structure of physical channels mapped to one slot in a sidelink according to an embodiment of the disclosure.

FIG. 6 is a diagram illustrating a mapping structure of physical channels mapped to one slot in a sidelink according to an embodiment of the disclosure.

Specifically, FIG. 6 shows mapping to PSCCH/PSSCH/PSFCH physical channels. PSCCH/PSSCH/PSFCH may be allocated to one or more sub-channels in frequency domain. For details on sub-channel allocation, the description of FIG. 3 is referred to. Next, with reference to FIG. 6 to describe the time domain mapping of PSCCH/PSSCH/PSFCH, one or more symbols before a transmitting UE transmits PSCCH/PSSCH/PSFCH in a slot 601 may be used a region 602 for automatic gain control (AGC). When such symbol(s) is used for the AGC, a method for repetition transmission of a signal of any other channel in that symbol region may be considered. In this case, as a repetition signal of other channel, a part of PSCCH symbols or PSSCH symbols may be considered. Contrary to this, a preamble may be transmitted in the AGC region. In case that the preamble signal is transmitted, there is an advantage that an AGC execution time can be further shortened compared to the method for repetition transmission of other channel signal. In case that a preamble signal is transmitted for the AGC, a specific sequence may be used as the preamble signal 602, and in this case, a sequence such as PSSCH DMRS, PSCCH DMRS, CSI-RS, etc. may be used as the preamble. In the disclosure, the sequence used as the preamble is not limited to the above examples. Additionally, according to FIG. 6, a PSCCH 603 containing control information is transmitted in early symbols of the slot, and data scheduled by the control information of the PSCCH 603 may be transmitted through a PSSCH 604. A part (1st stage SCI) of sidelink control information (SCI), which is control information, may be mapped to and transmitted via the PSCCH 603. Another part (2nd stage SCI) of the SCI, which is control information, as well as data may be mapped to and transmitted via the PSSCH 604. In addition, FIG. 6 shows that a physical sidelink feedback channel (PSFCH) 605, which is a physical channel for transmitting feedback information, is located in the last part of the slot. A certain empty time (gap) between the PSSCH 604 and the PSFCH 605 may be secured so that a UE that has transmitted or received the PSSCH 604 can prepare to transmit or receive the PSFCH 605. Also, after transmission and reception of the PSFCH 605, another empty time (gap) may be secured.

Figure 7:
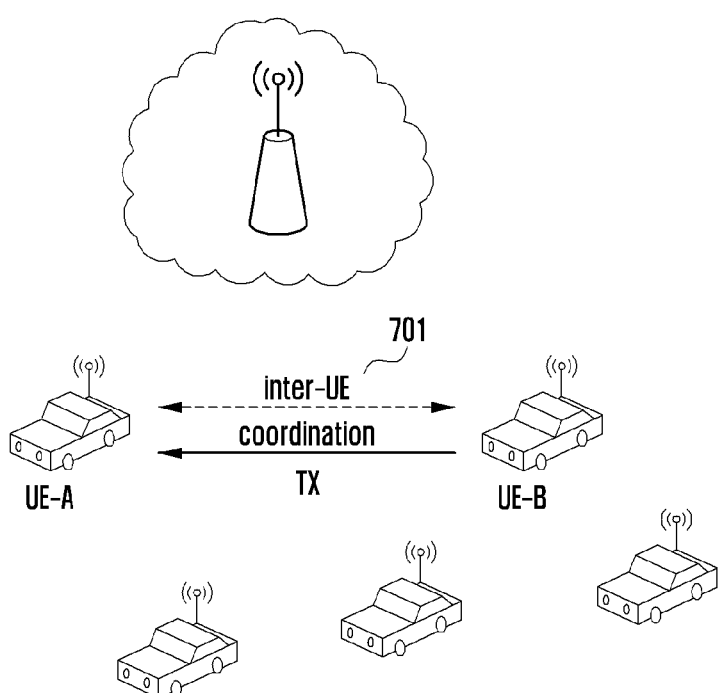
FIG. 7 is a diagram illustrating a scenario of performing cooperation between UEs in order to receive resource allocation related information from another UE according to an embodiment of the disclosure.

FIG. 7 is a diagram illustrating a scenario of performing cooperation between UEs in order to receive resource allocation related information from another UE according to an embodiment of the disclosure.

Specifically, a sidelink scenario for performing cooperation between UEs is illustrated in FIG. 7. In FIG. 7, UE-A corresponds to a UE that provides information for inter-UE coordination, and UE-B corresponds to a UE that receives information for inter-UE coordination and performs sidelink transmission. Here, the UE may be a vehicle UE or a pedestrian UE. The information for inter-UE coordination may be resource allocation information. However, in the disclosure, the information for inter-UE coordination is not limited only to resource allocation information. Although UE-A is defined as a UE providing information for inter-UE coordination in FIG. 7, information 701 for inter-UE coordination may be shared with each other before UE-A provides information for inter-UE coordination to UE-B. In this case, the information 701 for inter-UE coordination may be provided by UE-A to UE-B or by UE-B to UE-A, or provided in both directions by both UE-A and UE-B. Also, in the disclosure, only a specific transmission method is not assumed as an environment for performing inter-UE coordination in the sidelink. In other words, applying any transmission of broadcast, unicast, or groupcast may be considered. However, it is noted that, as described above, a unicast or groupcast transmission environment may be a useful scenario for performing inter-UE coordination. A condition of performing inter-UE coordination in the sidelink may be activated as a higher layer by the network or activated by (pre-)configuration. Alternatively, whether to perform inter-UE coordination may be configured through inter-UE PC5-RRC. In other words, when inter-UE coordination is activated, UE-A may provide information for the inter-UE coordination, and UE-B may use this to perform sidelink transmission.

In FIG. 7, as an example that UE-A and UE-B perform inter-UE coordination, a scenario in which UE-A provides resource allocation information to UE-B may be considered. In this case, the resource allocation information provided by UE-A may be information on one or more resource pool candidates for UE-B. Alternatively, the resource allocation information provided by UE-A may be information on one or more allocated resource candidates for UE-B. In case of the resource pool candidate information, UE-B may perform sidelink transmission by allocating a resource from one of the resource pools provided by UE-A. As described above, the resource pool indicates time and frequency domains from which a resource can be selected in the sidelink, and the UE may be allocated a transmission resource in the resource pool by the base station, or may allocate a transmission resource by directly performing sensing and resource selection. In case that the resource allocation information provided by UE-A is the allocated resource candidate information, the allocated resource candidate information indicates resource candidates allocated in a resource pool, and UE-A may expect that UE-B will perform sidelink transmission in the corresponding resource and, may also expect that sidelink transmission will be received from UE-B in the corresponding resource. Therefore, UE-B may perform sidelink transmission among the allocated resource candidates provided by UE-A. Here, UE-B may or may not use the resource allocation information provided by UE-A.

In FIG. 7, each of UE-A and UE-B may be an in-coverage (IC) UE located within the coverage of the base station, or a partial coverage (PC) UE or out-of coverage (OOC) UE located outside the coverage of the base station, as shown in Table 1 below.

TABLE 1

| Cases | UE-A | UE-B |
|-------|--------|--------|
| A | IC | IC |
| B | IC | PC/OOC |
| C | PC/OOC | IC |
| D | PC/OOC | PC/OOC |

In Case A of Table 1, because both UE-A and UE-B are located within the base station coverage, UE-A can provide resource allocation information configured by the base station to UE-B. If UE-A and UE-B are located within the coverage of different base stations, information of UE-B for resource allocation may be exchanged between the base stations. In Case B of Table 1, because UE-A is located within the base station coverage but UE-B is located outside the base station coverage, UE-A can provide resource allocation information configured by the base station to UE-B when information of UE-B for resource allocation is provided to the base station to which UE-A belongs. In Cases A and B of Table 1, UE-A may also provide resource allocation information to UE-B by directly performing sensing and resource selection operations for resource allocation for UE-B. In Cases C and D of Table 1, because UE-A is located outside the coverage of the base station, UE-A can use only a method of provide resource allocation information to UE-B by directly performing sensing and resource selection for resource allocation for UE-B.

In Case A of Table 1, if two UEs are within the coverage of the same base station, the same resource pool may be configured for UE-A and UE-B. However, in general, resource pool information configured for sidelink transmission to UE-A and UE-B may be different. Also, in the sidelink, one or more resource pools may be configured for each UE. If a plurality of resource pools are configured for the UE in the sidelink, the UE may select one resource pool suitable for transmission and perform sidelink transmission in the selected resource pool. For example, a case in which resource pools A, B, and C are allocated to UE-A and resource pools D and E are allocated to UE-B will be described. When UE-A and UE-B perform inter-UE coordination, in a scenario that UE-A provides resource allocation information to UE-B, the following cases for the resource pool used by UE-B for sidelink transmission may be considered.

Case-1: UE-B performs sidelink transmission in the resource pool configured for UE-B Case-2: UE-B performs sidelink transmission in the resource pool configured for UE-A rather than the resource pool configured for UE-B Case-3: UE-B performs sidelink transmission in the resource pool configured for inter-UE coordination between UE-A and UE-B In Case-1 above, in order for UE-A to provide resource allocation information to UE-B, information on resource pools D and E allocated to UE-B should be shared with UE-A. In Case-2 above, in order for UE-B to use the resource allocation information provided by UE-A, information on resource pools A, B, and C allocated to UE-A should be shared with UE-B. In Case-3 above, UE-A and UE-B perform inter-UE coordination in the resource pool shared with each other. For example, UE-A and UE-B may perform inter-UE coordination in resource pools F and G shared with each other. Therefore, in all cases of Table 1, in order for UE-A and UE-B to perform inter-UE coordination and in order for UE-A to provide resource allocation information to UE-B, resource pool information between UEs should be shared. For details on this, refer to the first embodiment below.

Next, when UE-A and UE-B perform inter-UE coordination and UE-A provides resource allocation information to UE-B, the resource allocation information provided by UE-A may be information on one or more allocated resource candidates for UE-B as described above. In this case, in order for UE-A to provide resource allocation information to UE-B, resource pool information should be shared between UEs. Specifically, UE-A may be allocated transmission resources by the base station or may directly allocate transmission resources through sensing and resource selection. To enable this, UE-A should be provided with information related to resource allocation to UE-B. Also, in case that UE-A indicates resource allocation, it may be possible to interpret the indicated resource allocation information only when resource pool information is shared between UE-A and UE-B. First, information provided by UE-B to UE-A may include the following. The following information is exemplary only, and the resource allocation related information provided by UE-B to UE-A in the disclosure is not limited to the following information.

Information Provided by UE-B to UE-A to Receive Resource Allocation Information

TX priority for UE-B

Remaining packet delay budget (PDB) for UE-B

Buffer state report (BSR) for UE-B

HARQ feedback for UE-B is enabled/disabled

Mode2 resource allocation information for UE-B

In the above information, the remaining PDB for UE-B may be information corresponding to a latency or delay requirement for a packet. In the above information, Mode 2 information for UE-B may include information such as Lsubch. Here, the Lsubch is the number of consecutive sub-channels of a resource candidate in frequency domain when UE-B selects a resource through Mode 2. However, the Lsubch may be not signaled and a method for UE-A to directly select may be considered. In this case, UE-A needs to indicate information of Lsubch to UE-B through resource allocation information of UE-B. In the disclosure, Mode 2 resource allocation information for UE-B is not limited only to Lsubch information. Thus, in case that UE-A receives one or more of the above information from UE-B, a method for UE-A to transmit this information to the base station within coverage through Uu RRC may be considered together. As such, in case that resource allocation information of UE-B is provided to the base station belonging to UE-A, UE-A may be allocated a transmission resource for UE-B by the base station.

The following embodiment is to propose a procedure (Mode 2) for the UE to perform sensing and resource selection in the sidelink described above. In addition, a Mode 2 method for minimizing power consumption of the UE is proposed. To this end, a method for performing 5 inter-UE coordination in which resource allocation related information is provided from other UE is proposed. Also, proposed are related operations of the UE and the base station. Following embodiments according to the disclosure may be applied to the UE that performs communication in 10 any communication environment including unicast, group-cast, and broadcast between UEs.

First Embodiment

The first embodiment proposes a method for sharing resource pool information in case of performing inter-UE coordination in a sidelink. It has been described through FIG. 7 that resource pool information should be shared between UE-A and UE-B in order for UE-A and UE-B to perform inter-UE coordination and in order for UE-A to provide resource allocation information to UE-B. The resource pool indicates time and frequency domains from which a resource can be selected in the sidelink, and various parameters related to the resource pool as well as time and frequency domain information from which a resource can be selected may be configured together as information on the resource pool. For example, Table 2 shows an example of parameter information included in the resource pool in LTE V2X. For example, with reference to Table 2, cbr-pssch-TxConfigList-r14 may be configured for each resource pool, and transmission parameters may be determined according to a CBR measurement result based on the cbr-pssch-TxConfigList-r14.

TABLE 2

| | | | |
|---|---|---|---|
| SL-CommResourcePoolV2X-r14 ::= | SEQUENCE { | | |
| sl-OffsetIndicator-r14 | SL-OffsetIndicator-r12 | OPTIONAL, | -- Need OR |
| sl-Subframe-r14 | SubframeBitmapSL-r14, | | |
| adjacencyPSCCH-PSSCH-r14 | BOOLEAN, | | |
| sizeSubchannel-r14 | ENUMERATED { | | |
| n4, n5, n6, n8, n9, n10, n12, n15, n16, n18, n20, n25, n30, | | | |
| n48, n50, n72, n75, n96, n100, spare13, spare12, spare11, | | | |
| spare 10, spare9, spare8, spare7, spare6, spare5, spare4, | | | |
| spare3, spare2, spare1}, | | | |
| numSubchannel-r14 | ENUMERATED {n1, n3, n5, n8, n10, n15, n20, | | |
| spare1}, | | | |
| startRB-Subchannel-r14 | INTEGER (0..99), | | |
| startRB-PSCCH-Pool-r14 | INTEGER (0.. 99) | OPTIONAL, | -- |
| Need OR | | | |
| rxParametersNCell-r14 | SEQUENCE { | | |
| tdd-Config-r14 | TDD-Config | OPTIONAL, | -- Need OP |
| syncConfigIndex-r14 | INTEGER (0..15) | | |
| } | | OPTIONAL, | -- Need OR |
| dataTxParameters-r14 | SL-TxParameters-r12 | OPTIONAL, | -- Cond |
| Tx | | | |
| zoneID-r14 | INTEGER (0..7) | OPTIONAL, | -- Need |
| OR | | | |
| threshS-RSSI-CBR-r14 | INTEGER (0..45) | OPTIONAL, | |
| Need OR | | | |
| poolReportId-r14 | SL-V2X-TxPoolReportIdentity-r14 | OPTIONAL, | -- |
| Need OR | | | |
| cbr-pssch-TxConfigList-r14 | SL-CBR-PPPP-TxConfigList-r14 | OPTIONAL, | -- |
| Need OR | | | |
| resourceSelectionConfigP2X-r14 | SL-P2X-ResourceSelectionConfig-r14 | OPTIONAL, | |
| -- Cond P2X | | | |
| syncAllowed-r14 | SL-SyncAllowed-r14 | OPTIONAL, | -- |
| Need OR | | | |
| restrictResourceReservationPeriod-r14 | SL-RestrictResourceReservationPeriodList-r14 | | |
| OPTIONAL, -- Need OR | | | |
| ..., | | | |
| [[ sl-MinT2ValueList-r15 | SL-MinT2ValueList-r15 | OPTIONAL, | -- Need OR |
| cbr-pssch-TxConfigList-v1530 | SL-CBR-PPPP-TxConfigList-v1530 | OPTIONAL | |
| Need OR | | | |
| ]] | | | |
| } | | | |

As another example, Table 3 shows an example of parameter information included in the resource pool in NR V2X. For example, with reference to Table 3, sl-MCS-Table-r16 is configured for each resource pool, and a decision on support of the configured MCS table may be made.

TABLE 3

```
SL-ResourcePool-r16 ::=                                    SEQUENCE {
sl-PSCCH-Config-r16          SetupRelease { SL-PSCCH-Config-r16 }          OPTIONAL,
-- Need M
sl-PSSCH-Config-r16          SetupRelease { SL-PSSCH-Config-r16 }          OPTIONAL,
-- Need M
sl-PSFCH-Config-r16          SetupRelease { SL-PSFCH-Config-r16 }          OPTIONAL,
-- Need M
sl-SyncAllowed-r16           SL-SyncAllowed-r16                            OPTIONAL,
-- Need M
sl-SubchannelSize-r16            ENUMERATED {n10, n15, n25, n50, n7, n100, TBD for
others}
sl-Period-r16                (FFS) OPTIONAL,   -- Need M
sl-TimeResource-r16          (FFS) OPTIONAL,   -- Need M
si-StartRB-Subchannel-r16        INTEGE(0..265)                           OPTIONAL,
-- Need M
si-NumSubchannel-r16                                        INTEGER  (1..27)
OPTIONAL,   -- Need M
sl-MCS-Table-r16                 ENUMERATED {qam64, qam256, qam64LowSE}
OPTIONAL,   -- Need M
sl-ThreshS-RSSI-CBR-r16                             INTEGER   (0..45)
OPTIONAL,   -- Need M
sl-TimeWindowSizeCBR-r16         ENUMERATED   {ms100,   slot100}
OPTIONAL,   -- Need M
sl-TimeWindowSizeCR-r16          ENUMERATED   {ms1000,   slot1000}
OPTIONAL,   -- Need M
sl-PTRS-Config-r16                             SL-PTRS-Config-r16
OPTIONAL,   -- Need M
sl-ConfiguredGrantConfigList-r16               SL-ConfiguredGrantConfigList-r16
OPTIONAL,   -- Need M
sl-UE-SelectedConfigRP-r16                     SL-UE-SelectedConfigRP-r16
OPTIONAL,   -- Need M
sl-RxParametersNcell-r16             SEQUENCE {
sl-TDD-Config-r16                TDD-UL-DL-ConfigCommon          OPTIONAL,
sl-SyncConfigIndex-r16           INTEGER (0..15)
}           OPTIONAL,   -- Need M
...
}
```

As shown in Tables 2 and 3 above, various parameters related to the resource pool as well as time and frequency domain information for selecting a resource for the resource pool may be configured together. Therefore, a large amount of information may be required to share resource pool information between UEs. For sharing of the resource pool information between UEs, the following method may be considered.

Method for Sharing Resource Pool Information Between UEs

Method 1: Configuration via PC5-RRC

Method 2: Configuration via SL MAC CE

Method 3: Configuration through 2nd stage SCI

First, Method 1 is a method of sharing resource pool information through PC5-RRC connection in case that the PC5-RRC connection between UEs is established in the sidelink. Method 2 is a method of sharing resource pool information through MAC CE in case that the PC5-RRC connection is established in the sidelink. Method 3 is a method of sharing resource pool information through 2nd stage SCI. It is assumed that UE-A and UE-B of FIG. 7 share resource pools A, B, and C through the above method. Such shared resource pools may correspond to Case 1/2/3 described above in FIG. 7. In other words, resource pools A, B, and C may be resource pools allocated to UE-B (Case-1), may be resource pools allocated to UE-A (Case-2), or may be resource pools shared for inter-UE coordination independently of the resource pools allocated to UE-A and UE-B (Case-3). In such cases, the maximum number of resource pools that can be allocated to each UE may be predetermined. If the maximum number of resource pools that can be allocated to each UE is limited to X, and if the number of resource pools configured in the UE exceeds X due to the resource pool shared between UEs, a method of limiting the resource pool that can be shared between UEs or overwriting the resource pool allocated first among the resource pools previously allocated to the UE may be considered.

In the disclosure, a method for sharing resource pool information is not limited to Methods 1 to 3 above. In addition, a combination of the above Methods may be considered as a method for sharing resource pool information. For example, the following combinations may be considered.

Methods 1+2: A method of indicating a resource pool index to be shared through SL MAC CE after information on a plurality of resource pools is shared through PC5-RRC Methods 1+3: A method of indicating a resource pool index to be shared through 2nd stage SCI after information on a plurality of resource pools is shared through PC5-RRC Methods 2+3: A method of indicating a resource pool index to be shared through 2nd stage SCI after information on a plurality of resource pools is shared through SL MAC CE The above combination of methods may be a more effective method in case that a plurality of resource pools are configured upon performing inter-UE coordination and information on one or more resource pools needs to be shared. For example, in case of Methods 1+2, after resource pools A, B, and C between UE-A and UE-B are shared through PC5-RRC, a resource pool A may be shared through SL MAC CE indicating the index corresponding to the resource pool A. Alternatively, after resource pools A, B, and C between UE-A and UE-B are shared through PC5-RRC, resource pools A and B may be shared through SL MAC CE indicating the index corresponding to the resource pools A and B. In case that information on a plurality of resource pools is shared, the amount of information related to the resource pools to be shared increases, and this problem may be alleviated through the above combination of methods.

If multiple resource pools are shared for inter-UE coordination, a method for the UE to select a resource pool to be used based on CBR in the resource pools may be considered. First, the CBR measured in a specific slot n may be defined as follows.

CBR may be defined as a ratio of sub-channels in which a sidelink received signal strength indicator (RSSI) measured by the UE in the resource pool exceeds a (pre)determined threshold. Here, the CBR measurement may be performed in the slot [n-X, n-1], and a slot index may be based on a physical slot index.

The CBR measurement from a viewpoint of transmission may also be simultaneously performed for both a PSSCH region and a PSCCH region. With reference to FIG. 6, a PSSCH related to a part of a PSCCH may be transmitted in a frequency resource that does not overlap with the PSCCH and a time resource that overlaps with the PSCCH, and in another example, at least a part of a related PSSCH and PSCCH may be transmitted in non-overlapping time resource. Here, 'related' means that the PSCCH includes at least information necessary for decoding the PSSCH. As described above, in case that the PSCCH and the PSSCH are multiplexed, on the assumption that the transmission power of the PSCCH region and the PSSCH region is constant, and accordingly the RSSI can be measured equally in the PSCCH region and the PSSCH region, the CBR measurement may be performed simultaneously in both regions without distinguishing between the PSSCH region and the PSCCH region. Specifically, in FIG. 6, the RSSI may be measured in symbols of the PSCCH region and the PSSCH region. When the PSCCH and the PSSCH are multiplexed as shown in FIG. 6, it may be difficult for the UE to distinguish between the PSCCH region and the PSSCH region when measuring the CBR. Therefore, the CBR measurement may be performed in symbols of both the PSCCH region and the PSSCH region without distinguishing between the PSCCH region and the PSSCH region.

X is a size value of a window in which the CBR is measured, and X may be a fixed value or a configurable value. As an example when X is one fixed value, X may be configured as 100 slots. When X is a configurable value, the configured value of X may be included in resource pool configuration information. Before the UE is RRC-connected to the base station, the corresponding values may be pre-configured for the UE, or the UE may receive configuration through the SIB from the base station. After the UE is RRC-connected to the base station, X may be configured in a UE-specific manner. In addition, X may be configured through PC5-RRC connection between UEs. For example, X may be configured as one of {100·2μ, 100} slots through resource pool configuration information. Here, μ is an index corresponding to numerology and is configured as the following value according to subcarrier spacing (SCS).

SCS=15 kHz, μ=0
SCS=30 kHz, μ=1
SCS=60 kHz, μ=2
SCS=120 kHz, μ=3

Among the above two configuration methods, a case where X is configured as 100·2μ corresponds to a method in which the number of slots of the CBR window corresponding to 100 ms is changed according to the SCS, and a case where X is configured as 00 corresponds to a method in which the CBR window is fixed to 100 slots regardless of the SCS. Therefore, in case where X is configured as 100, the measurement time (ms) of the CBR window may vary.

Sidelink RSSI refers to received signal strength. That is, the sidelink RSSI indicates the power (unit: [W]) received by the receiving UE, and is observed by the effective OFDM symbol positions of the corresponding channel in the slot of the sidelink and the configured sub-channel.

Based on the CBR value measured by the definition of CBR, it may be determined whether the corresponding channel is congested. The UE may report the measured CBR to the base station. Specifically, when the base station and the UE are connected through Uu-RRC, the CBR value measured by the UE may be reported to the base station through Uu-RRC. In Mode 1 among the sidelink resource allocation schemes, when a transmitting UE requests a transmission resource for performing sidelink communication with a receiving UE from the base station, the base station may allocate the transmission resource using the reported CBR information. Meanwhile, in Mode 2 among the sidelink resource allocation schemes, the UE not only directly performs resource allocation through sensing, but also should determine whether to access a channel, and a transmission parameter by reflecting the CBR measured by the UE. Therefore, in Mode 2, the UE may perform congestion control by measuring a channel occupancy ratio (CR) along with the CBR measurement. In this case, the priority of a packet may be reflected. In case that the transmitting UE transmits a packet, a value for indicating the priority of the packet may be transmitted to the receiving UE through the SCI. The CR is an index indicating how much the UE occupies the channel, and the CR limit for the UE to occupy the channel may be determined according to the CBR value. For example, in case of a congested channel (i.e., when the CBR value is measured high), the CR limit is configured to be low, and the UE may perform congestion control so that the measured CR does not exceed the CR limit. In order to perform congestion control, the UE may allow the measured CR to satisfy the CR limit through transmission drop or scheduling implementation. In case of non-congested channel (i.e., when the CBR value is measured low), the CR limit is configured to be high, and because the probability that the measured CR does not exceed the CR limit increases, it may be possible for the UE to more occupy and use the channel.

However, the CBR values measured by UEs performing transmission and reception in the sidelink may have different values. For example, in FIG. 7, in case that UE-B is a UE performing sidelink transmission, and that UE-A is a UE performing inter-UE coordination, providing resource allocation information to UE-B, and receiving sidelink transmission from UE-B, the CBR value measured by UE-A and the CBR value measured by UE-B may be different. For example, a small number of UEs are distributed around UE-B, and thus a low CBR may be measured, and a large number of UEs are distributed around UE-A, and thus a high CBR may be measured. Therefore, in the process of sharing resource pool information between UEs, CBR information measured by each UE may also be shared. For example, assuming that UE-A and UE-B of FIG. 7 share resource pools A, B, and C, for each resource pool the CBR information measured by UE-A and the CBR information measured by UE-B may be shared between UE-A and UE-B. Specifically, the following CBR information may be shared between UEs.

In resource pool A, the CBR information measured by UE-A and the CBR information measured by UE-B may be different, and such CBR information may be shared between UE-A and UE-B.

In resource pool B, the CBR information measured by UE-A and the CBR information measured by UE-B may be different, and such CBR information may be shared between UE-A and UE-B.

In resource pool C, the CBR information measured by UE-A and the CBR information measured by UE-B may be different, and such CBR information may be shared between UE-A and UE-B.

In this case, as a method of sharing the CBR, the above-described methods 1 to 3 for sharing the resource pool or a combination thereof may be used. Also, if the CBR information is shared between UEs as described above, the following method may be considered as a method for selecting one resource pool to be used among a plurality of resource pools based on the CBR of each resource pool.

$$\min_j(\max_{i\in\{A,B\}}\mathrm{CBR}(i,j))$$

In the above equation, 'i' is an index indicating UE-A or UE-B in FIG. 7. In addition, 'j' is an index indicating a resource pool. According to the above equation, the UE may select a resource pool having the lowest CBR value based on a larger value among CBR values measured by two UEs from a plurality of resource pools.

Second Embodiment

The second embodiment provides a method in which UE-B requests resource allocation from UE-A in case of performing inter-UE coordination in the sidelink as shown in FIG. 7. This may be interpreted as an operation in which UE-B sends a scheduling request (SR) to UE-A. As a condition for UE-B to send the SR to UE-A, UE-B may send the SR to UE-A in case that the remaining packet delay budget (PDB) for packet transmission of UE-B is sufficiently large in consideration of the delay occurring in inter-UE coordination. If this condition is not satisfied, information received by UE-B requesting resource allocation from UE-A may not be useful information. Under the assumption that this condition is satisfied, the following methods may be considered as a method for UE-B to request the SR from UE-A. In the following description of the embodiment, the scheduling request (SR) is only named as an example and does not limit the disclosure. The operation described in the second embodiment may include any operation for UE-B to request resource allocation from UE-A, that is, to request inter-UE coordination, when performing inter-UE coordination in the sidelink. In addition, the scheduling request (SR) may be replaced with an arbitrary message or signaling for requesting the resource allocation information.

Method for UE-B to Request SR from UE-A
  Method 1: Request through SL MAC CE
  Method 2: Request through 1st stage SCI
  Method 3: Request through 2nd stage SCI
  First, Method 1 is a method of sharing resource pool information through the sidelink MAC CE when the PC5-RRC connection is established in the sidelink. Also, Methods 2 and 3 are methods of sharing resource pool information through the 1st stage SCI and the 2nd stage SCI, respectively. In case of using Method 2, there is a problem that it cannot be applied to the existing UE because there is no SR-related field in the 1st stage SCI of the Rel-16 sidelink. A method for requesting the SR in the disclosure is not limited to the above Methods. In addition, while transmitting the SR to UE-A, UE-B may also transmit a part of 'information provided by UE-B to UE-A in order to receive resource allocation information' described above. However, because the 'information provided by UE-B to UE-A in order to receive resource allocation information' has a very large signaling overhead for providing related information, a method other than Method 2 may be used.

Next, in case that UE-B requests the SR from UE-A, UE-A may receive it and request resource allocation of UE-B to the base station to which UE-A belongs, or directly select a resource for UE-B through sensing, and then provide resource allocation information to UE-B. For a detailed method for UE-A to directly select a resource for UE-B through sensing, refer to the fourth embodiment below. Described in this embodiment is a case where UE-A receives the SR from UE-B, but UE-A cannot provide resource allocation information to UE-B. For a detailed method for a case where UE-A receives the SR from UE-B and provides resource allocation information to UE-B, refer to the third embodiment below. First, the following cases may be considered as a case where UE-A receives the SR from UE-B but UE-A cannot provide resource allocation information to UE-B.

Case-1: Case where UE-A operates in an exceptional pool

Case-2: Case where it is determined that inter-UE coordination is impossible due to delay In Case-1, when UE-A performs handover, UE-A operates in the exceptional pool, and in this case, it becomes difficult for UE-A to request resource allocation to UE-B from the base station. In addition, when operating in the exceptional pool, it becomes difficult to provide valid resource allocation information to UE-B because UE-A performs random selection for directly selecting resources. In Case-2, resource allocation information to be provided to UE-B by UE-A that requests resource allocation of UE-B from its base station or directly selects resources for UE-B through sensing may no longer be valid due to the delay. For example, it may correspond to a case where although the PDB for resource transmission of UE-B is Xms, it is determined that the resource for UE-B cannot be selected within Xms. In the disclosure, the case in which UE-A cannot provide resource allocation information to UE-B is not limited to the above case. In case where the SR request is received from UE-B, but it is determined that UE-A cannot provide resource allocation information to UE-B, an operation for performing a response may be considered. As an example, it is possible to signal whether or not UE-A can provide resource allocation information to UE-B through simple 1-bit information, and an indication method through SL MAC CE or 2nd stage SCI may be considered. Meanwhile, the above-described methods are exemplary only, and a method for indicating whether UE-A can provide resource allocation information to UE-B in the disclosure is not limited to the above method.

Third Embodiment

The third embodiment provides a method in which UE-A provides resource allocation information to UE-B in case of performing inter-UE coordination in the sidelink as shown in FIG. 7. In case that UE-B transmits the SR to UE-A according to the second embodiment, UE-A may receive it and request resource allocation of UE-B to the base station to which UE-A belongs, or directly select a resource for UE-B through sensing, and then provide resource allocation information to UE-B. In this case, the following methods may be considered as a method for UE-A to provide the selected resource allocation information to UE-B.
Method for UE-A to Provide Resource Allocation Information to UE-B
    Method 1: Provision of resource allocation information through SL MAC CE
    Method 2: Provision of resource allocation information through 1st stage SCI
    Method 3: Provision of resource allocation information through 2nd stage SCI First, Method 1 is a method of signaling resource allocation information through the sidelink MAC CE when the PC5-RRC connection is established in the sidelink. Also, Methods 2 and 3 are methods of signaling resource allocation information through the 1st stage SCI and the 2nd stage SCI, respectively. In case of using Method 2, there is a problem that it cannot be applied to the existing UE because there is no related field in the 1st stage SCI of the Rel-16 sidelink. However, in the 1st stage SCI of the Rel-16 sidelink, there is a field indicating resource allocation information reserved by the UE for sidelink transmission. This is to allow another UE to receive that information and use it to select a transmission resource. In an embodiment, a method may be considered in which UE-A and UE-B interpret the above field as resource allocation information indicated by UE-A to UE-B rather than resource allocation information reserved by UE-A. This may be possible by introducing an additional 1-bit field to the 1st stage SCI to indicate whether the above field is resource allocation information reserved by UE-A or resource allocation information indicated by UE-A to UE-B. In the disclosure, the method for UE-A to provide resource allocation information to UE-B is not limited to the above Methods.

In addition, the resource allocation information provided by UE-A to UE-B may include the following.
    Location information of an initial resource for the same one TB
    Location information of a retransmission resource for the same one TB First, the location information of the initial resource for at least one TB may be included in the resource allocation information. In the disclosure, it may be assumed that the number of sub-channels in frequency domain is the same in the initial resource and the retransmission resource. If different, additional information should be indicated. Thus, the location information of the resource may be information on a transmission location in time domain and a sub-channel start location in frequency domain. Generally, in case that the UE selects a resource for its sidelink transmission in Mode 2 operation of the sidelink, the location information on the initial resource is determined by the location information on PSCCH transmission and thereby does not need to be signaled separately. However, in case that inter-UE coordination is performed in the sidelink and UE-A provides resource allocation information to UE-B as in the disclosure, UE-A needs to additionally indicate the location information (a location in time domain and a sub-channel start location in frequency domain) of the initial resource to UE-B. In this case, the following method may be considered as a method of determining the location in time domain.
    Alt-1: The offset from the first slot of a resource pool of PSSCH determined based on a system frame number (SFN) or a direct frame number (DFN) is indicated
    Alt-2: When UE-A indicates resource allocation information to UE-B, the first slot belonging to a PSSCH resource pool after a slot receiving the resource allocation information is determined as an initial transmission location in time domain
    In addition, when UE-A indicates to UE-B the locations of initial and retransmission resources for the same one TB through resource allocation information as above, UE-B may perform periodic resource reservation based on the resource location of one TB indicated by UE-A based on a resource reservation period (P) indicated by the upper level.

Fourth Embodiment

Figure 8:
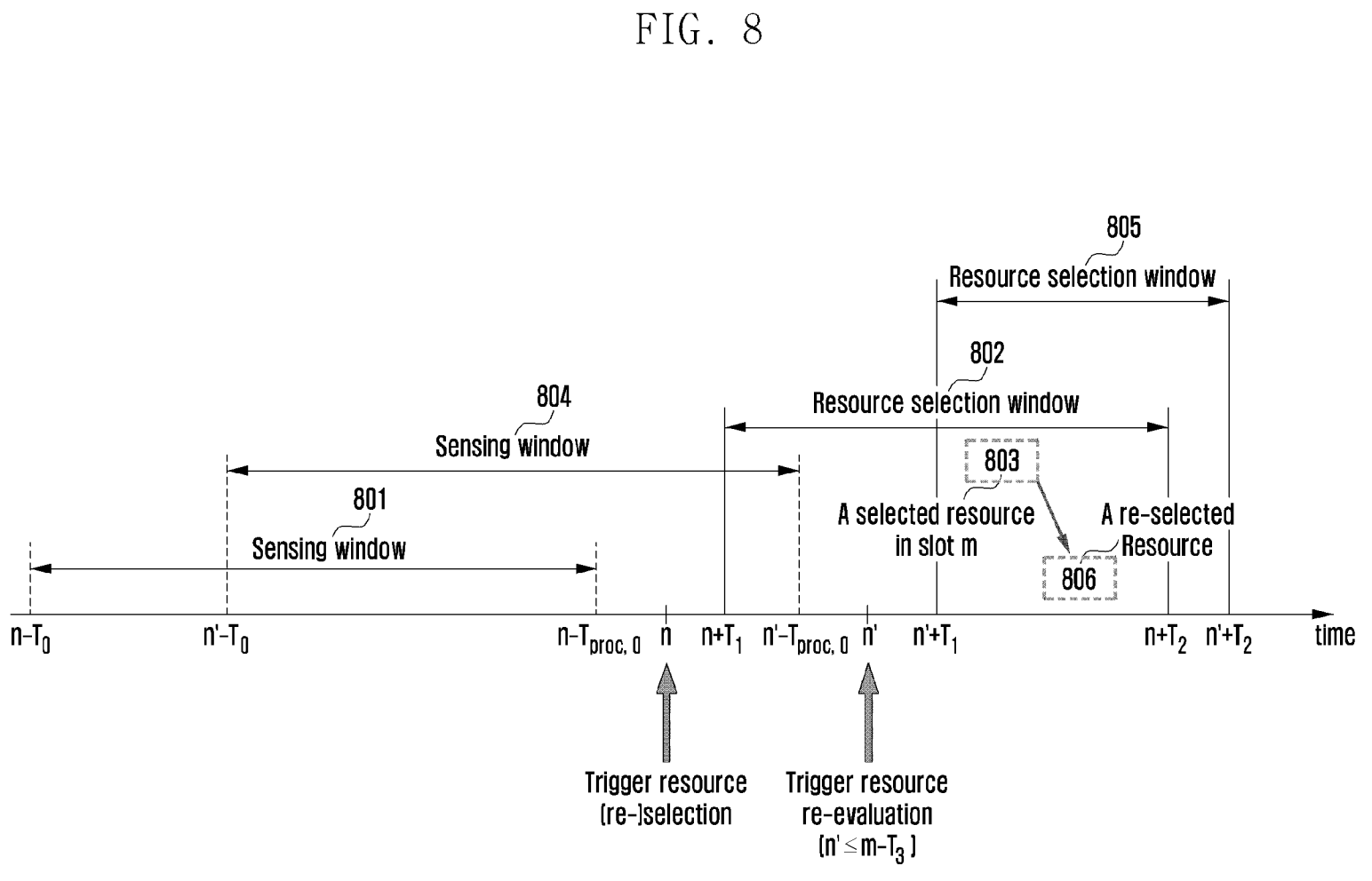

The fourth embodiment provides a method for UE-A to provide resource allocation information to UE-B through the direct sensing and resource selection process (Mode 2) in case of performing inter-UE coordination in the sidelink as shown in FIG. 7. FIG. 8 is a diagram defining a sensing widow and a resource selection widow required for UE-A to perform resource (re)selection and re-evaluation for resource allocation of UE-B according to an embodiment of the disclosure.

Specifically, shown in FIG. 8 is an example in which triggering for resource (re-)selection is performed at time n, sensing is continuously performed even after the (re-) selection triggering time n, and triggering for re-evaluation is performed at time n' (n'>n). A condition for triggering resource (re-)selection may be when a UE receives a resource allocation request from another UE. Specifically, in FIG. 7, it may be a time point at which UE-A receives an SR transmitted by UE-B to UE-A. When resource (re-)selection triggering occurs at time n, before the reservation for a selected resource after resource selection is signaled via SCI, and if a re-evaluation condition at time n' (n'>n) is satisfied, triggering for resource (re-)selection may occur again.

When triggering for resource (re-)selection is performed at time n, a sensing window 801 may be defined as [n−T0, n−Tproc,0]. Here, T0 is the starting point of the sensing window and may be (pre-)configured with resource pool information. As an example, T0 may be a positive integer in ms, but the disclosure does not limit T0 to a specific value. In addition, Tproc,0 may be defined as the time required to process the sensed result. The disclosure does not limit the value configured as Tproc,0 to a specific value. If Tproc,0 is defined as a positive integer in ms or in units of slots, the sensing window 801 may be defined as [n−T0, n−Tproc,0]. In addition, the sensing window may refer to an interval configured by being converted into a logical slot belonging to the resource pool before slot n.

Next, when triggering for resource (re-)selection is performed at time n, a resource selection window 802 may be determined as [n+TX, n+T2]. Here, TX may be determined according to the following conditions.

$$TX = T1 \text{ if } Td < T1$$

$$TX = Td \text{ if } Td \geq T1$$

Here, T1 is a slot unit value and may be selected by UE implementation for T1≤Tproc,1. Tproc,1 may be defined as the maximum reference value in consideration of the processing time required to select a resource. For example, the value of Tproc,1 may be fixed to 4 ms. In addition, Td may be defined as a value in which a delay occurring in performing inter-UE coordination in the sidelink is reflected, and may be configured via an upper layer. The disclosure does not limit the values configured as Tproc,1 and Td to specific values. In addition, T2 is a slot unit value greater than TX and may be selected by the UE within a range that satisfies T2 min≤T2≤remaining packet delay budget (PDB). Here, T2 min is to prevent the UE from selecting T2 having an excessively small value. Here, the T2 min value according to the priority, 'T2 min(priority)', may be configured through a higher layer.

Next, an operation of performing re-evaluation by continuously performing sensing even after triggering for resource (re-)selection is made at time n may be considered. If triggering for resource (re-)selection is performed at time n to select a transmission resource and then it is determined that the selected resource is not suitable for transmission by continuously performing sensing, triggering for changing an already selected resource 803 at time n' (n'>n) may be defined as re-evaluation. In this case, a resource 806 may be re-selected by a condition of triggering re-evaluation. The operation that the UE triggers the re-evaluation of the selected resource at time n' (n'>n) after the time n of triggering the resource (re-)selection may be performed in case that the UE does not reserve the resource 803 selected by triggering resource (re-)selection. In this case, the reservation for the resource may be interpreted as an operation of providing information on the selected resource to another UE. Therefore, the above condition may also be defined as before the UE-A indicates information on a resource selected for UE-B through 'the method for UE-A to provide resource allocation information to UE-B' in FIG. 7. In FIG. 8, a sensing window 804 and a resource selection window 805 for the time n' (n'>n) of triggering re-evaluation are shown together.

In the disclosure, when UE-A is defined as a UE that provides information for inter-UE coordination, and UE-B is defined as a UE that performs sidelink transmission by receiving the information for inter-UE coordination, UE-A may select N≤Nmax resources for one TB by performing an operation of identifying resource candidates for resource selection in the resource selection window and an operation of selecting a resource for transmission from the identified resource candidates, and deliver related frequency-time resource allocation information to UE-B.

Fifth Embodiment

Figure 9:
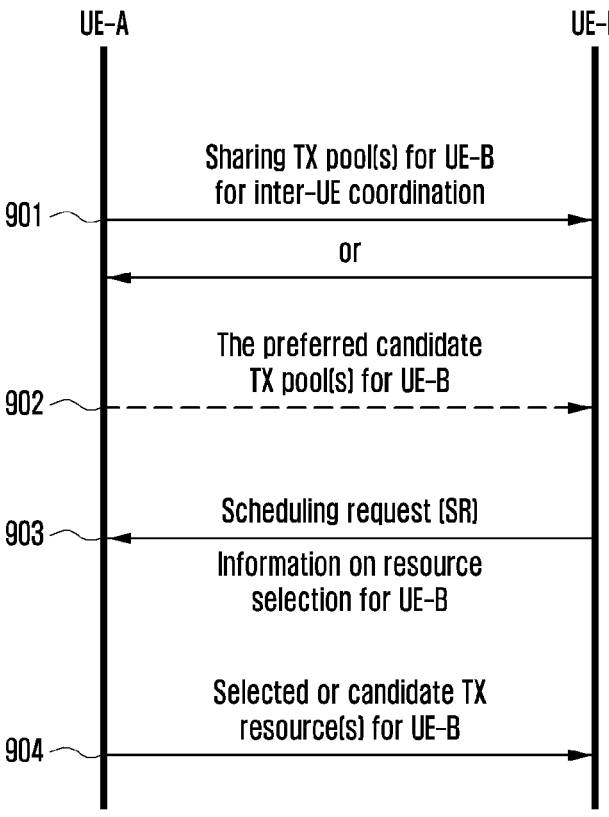
FIG. 9 is a flowchart illustrating an overall process of performing cooperation between UEs in sidelink communication according to an embodiment of the disclosure.

In the fifth embodiment, an overall flowchart for performing inter-UE coordination in the sidelink through the first to fourth embodiments will be described with reference to FIG. 9. In FIG. 9, UE-A corresponds to a UE that provides information for inter-UE coordination, and UE-B corresponds to a UE that receives the information for inter-UE coordination and performs sidelink transmission. The flowchart shown in FIG. 9 includes all of the methods proposed in the first to fourth embodiments, but some operations may be omitted or only some operations may be performed in the operation of performing inter-UE coordination in the sidelink.

First, 901 in FIG. 9 indicates an operation of sharing resource pool information in case of performing inter-UE coordination in the sidelink as proposed in the first embodiment. As shown in 901, the sharing of the resource pool may be made from UE-A to UE-B, from UE-B to UE-A, or both ways, and the 'method for sharing resource pool information between UEs' in the first embodiment is referred to. When one or more resource pools used for inter-UE coordination are configured, UE-A may indicate preferred resource pool information to UE-B as in step 902. In an embodiment, the step 902 may be omitted in case that separate signaling is not required, such as a case where only one resource pool used for inter-UE coordination is configured, or a case where a plurality of resource pools are configured but preferred resource pool information may be determined according to a predetermined rule.

Next, 903 in FIG. 9 indicates an operation that UE-B requests resource allocation from UE-A as proposed in the second embodiment. This may be interpreted as an operation that UE-B sends a scheduling request (SR) to UE-A. In this case, UE-B may deliver information necessary for UE-A to allocate resources to UE-B together with the SR or separately to UE-A. In this case, for related information that UE-B can deliver to UE-A for resource allocation, refer to the above 'information provided by UE-B to UE-A to receive resource allocation information'. When UE-A receives the SR from UE-B, UE-A may provide resource allocation information to UE-B by requesting resource allocation of UE-B from the base station or directly selecting a resource for UE-B through sensing. For a detailed operation of UE-A that directly selects a resource for UE-B through sensing, refer to the fourth embodiment. When UE-A performs an operation of directly selecting a resource for UE-B through sensing, if the corresponding resource pool is a pool that allows resource selection for sidelink transmission of UE-A, the UE may simultaneously perform a resource selection operation for UE-B and a sensing and resource selection operation for sidelink transmission of UE-A from the corresponding pool. In this case, the same sensing window and resource selection window may be assumed. However, in case that a resource pool for performing resource selection for UE-B and a resource pool for sidelink transmission of UE-A are distinct, the UE may perform the sensing and resource selection operation in each corresponding resource pool.

Finally, 904 in FIG. 9 indicates an operation that UE-A provides resource allocation information to UE-B as proposed in the third embodiment. For a method of indicating resource allocation information and details of the resource allocation information, refer to the third embodiment. When UE-A provides resource allocation information to UE-B, UE-B may operate to only refer to the information and determine whether to select it as a sidelink transmission resource. Alternatively, when UE-A provides resource allocation information to UE-B, UE-B may operate to perform sidelink transmission using the corresponding information. In the latter case, because UE-B does not need to separately perform a Mode 2 operation for sidelink transmission resource selection, the UE has an advantage of reducing power consumption.

Figure 10:
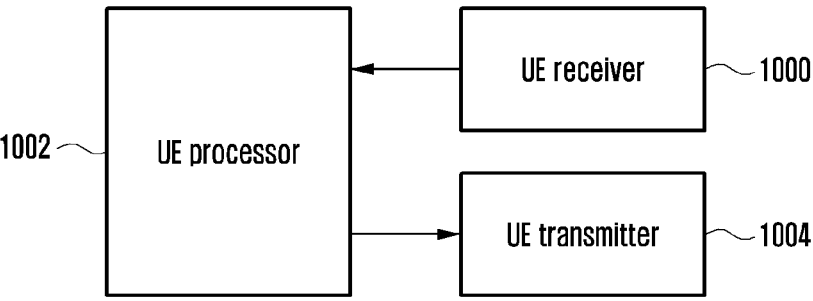
FIG. 10 is a block diagram illustrating the constitution of a UE according to an embodiment of the disclosure.
Figure 11:
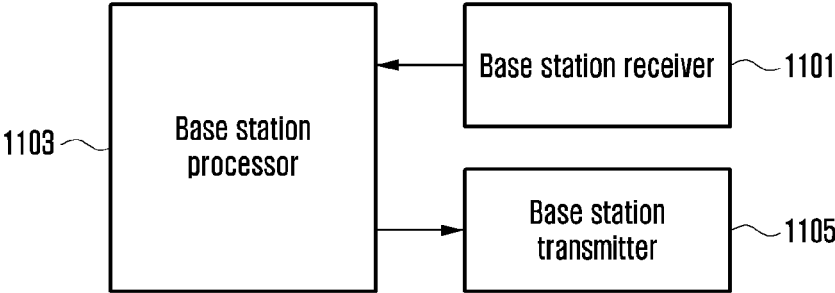
FIG. 11 is a block diagram illustrating the constitution of a base station according to an embodiment of the disclosure.

A transmitter, a receiver, and a processor of each of the UE and the base station for performing the above embodiments of the disclosure are illustrated in FIGS. 10 and 11. The above embodiments show a method for the UE to perform sensing and resource selection in the sidelink, and in order to perform the method, the receiver, the processor, and the transmitter of each of the base station and the UE may operate according to the embodiments.

Specifically, FIG. 10 is a block diagram illustrating an internal structure of a UE according to an embodiment of the disclosure.

As shown in FIG. 10, the UE of the disclosure may include a UE receiver 1000, a UE transmitter 1004, and a UE processor 1002. The UE receiver 1000 and the UE transmitter 1004 may be collectively referred to as a transceiver in embodiments of the disclosure. The transceiver may transmit/receive a signal to/from the base station. This signal may include control information and data. To this end, the transceiver may include an RF transmitter for up-converting and amplifying a frequency of a signal to be transmitted, and an RF receiver for low-noise amplifying and down-converting a received signal. In addition, the transceiver may receive a signal through a wireless channel and output it to the UE processor 1002, and transmit a signal outputted from the UE processor 1002 through a wireless channel. The UE processor 1002 may control a series of processes such that the UE can operate according to the above-described embodiments of the disclosure.

FIG. 11 is a block diagram illustrating an internal structure of a base station according to an embodiment of the disclosure.

As shown in FIG. 11, the base station of the disclosure may include a base station receiver 1101, a base station transmitter 1105, and a base station processor 1103. The base station receiver 1101 and the base station transmitter 1105 may be collectively referred to as a transceiver in embodiments of the disclosure. The transceiver may transmit/receive a signal to/from the UE. This signal may include control information and data. To this end, the transceiver may include an RF transmitter for up-converting and amplifying a frequency of a signal to be transmitted, and an RF receiver for low-noise amplifying and down-converting a received signal. In addition, the transceiver may receive a signal through a wireless channel and output it to the base station processor 1103, and transmit a signal outputted from the base station processor 1103 through a wireless channel. The base station processor 1103 may control a series of processes such that the base station can operate according to the above-described embodiments of the disclosure.

Meanwhile, the embodiments disclosed in the specification and drawings are only presented as specific examples to easily explain the technical contents of the disclosure and help the understanding of the disclosure, and it is not intended to limit the scope of the disclosure. That is, it will be apparent to those of ordinary skill in the art to which the disclosure pertains that other modifications are possible based on the technical contents of the disclosure. In addition, the above-described embodiments may be operated in combination with each other as needed. For example, in all embodiments of the disclosure, parts may be combined with each other to operate a base station and a UE.

The invention claimed is:

1. A method performed by a first user equipment (UE) in a communication system, the method comprising:
　　receiving, from a second UE, a request for inter UE coordination information;
　　transmitting, to the second UE, the inter UE coordination information; and
　　receiving, from the second UE, a physical sidelink shared channel (PSSCH) or a physical sidelink control channel (PSCCH) on a resource selected based on the inter UE coordination information,
　　wherein the request for the inter UE coordination information is received via 2nd-stage sidelink control information (SCI) carried on PSSCH or via a first sidelink (SL) medium access control control element (MAC CE),
　　wherein, in case that the request for the inter UE coordination information is received via the first SL MAC CE, the first SL MAC CE includes information on a priority and information on a number of subchannels,
　　wherein the inter UE coordination information includes time resource information indicating an offset from a reference slot and frequency resource information indicating a location of a starting subchannel, and
　　wherein the reference slot is determined based on a direct frame number (DFN).

2. The method of claim 1, wherein the inter UE coordination information is transmitted via 2nd-stage SCI carried on PSSCH or via a second SL MAC CE.

3. The method of claim 1, wherein a resource reservation period and a resource selection window are indicated by a higher layer.

4. A method performed by a second user equipment (UE) in a communication system, the method comprising:
　　transmitting, to a first UE, a request for inter UE coordination information;
　　receiving, from the first UE, the inter UE coordination information; and
　　transmitting, to the first UE, a physical sidelink shared channel (PSSCH) or a physical sidelink control channel (PSCCH) on a resource selected based on the inter UE coordination information,
　　wherein the request for the inter UE coordination information is transmitted via 2nd-stage sidelink control information (SCI) carried on PSSCH or via a first sidelink (SL) medium access control control element (MAC CE),
　　wherein, in case that the request for the inter UE coordination information is transmitted via the first SL MAC CE, the first SL MAC CE includes information on a priority and information on a number of subchannels,
　　wherein the inter UE coordination information includes time resource information indicating an offset from a reference slot and frequency resource information indicating a location of a starting subchannel, and
　　wherein the reference slot is determined based on a direct frame number (DFN).

5. The method of claim 4, wherein the inter UE coordination information is received via 2nd-stage SCI carried on PSSCH or via a second SL MAC CE.

6. The method of claim 4, wherein a resource reservation period and a resource selection window are indicated by a higher layer.

7. A first user equipment (UE) in a communication system, the first UE comprising:
　　a transceiver; and
　　a controller configured to:
　　　receive, from a second UE, a request for inter UE coordination information;
　　　transmit, to the second UE, the inter UE coordination information; and
　　　receive, from the second UE, a physical sidelink shared channel (PSSCH) or a physical sidelink control channel (PSCCH) on a resource selected based on the inter UE coordination information,
　　wherein the request for the inter UE coordination information is received via 2nd-stage sidelink control information (SCI) carried on PSSCH or via a first sidelink (SL) medium access control control element (MAC CE), wherein, in case that the request for the inter UE coordination information is received via the first SL MAC CE, the first SL MAC CE includes information on a priority and information on a number of subchannels, wherein the inter UE coordination information includes time resource information indicating an offset from a reference slot and frequency resource information indicating a location of a starting subchannel, and wherein the reference slot is determined based on a direct frame number (DFN).

8. The first UE of claim 7, wherein the inter UE coordination information is transmitted via 2nd-stage SCI carried on PSSCH or via a second SL MAC CE.

9. The first UE of claim 7, wherein a resource reservation period and a resource selection window are indicated by a higher layer.

10. A second user equipment (UE) in a communication system, the second UE comprising:

a transceiver; and a controller configured to:

transmit, to a first UE, a request for inter UE coordination information;

receive, from the first UE, the inter UE coordination information; and transmit, to the first UE, a physical sidelink shared channel (PSSCH) or a physical sidelink control channel (PSCCH) on a resource selected based on the inter UE coordination information, wherein the request for the inter UE coordination information is transmitted via 2nd-stage sidelink control information (SCI) carried on PSSCH or via a first sidelink (SL) medium access control control element (MAC CE), wherein, in case that the request for the inter UE coordination information is transmitted via the first SL MAC CE, the first SL MAC CE includes information on a priority and information on a number of subchannels, wherein the inter UE coordination information includes time resource information indicating an offset from a reference slot and frequency resource information indicating a location of a starting subchannel, and wherein the reference slot is determined based on a direct frame number (DFN).

11. The second UE of claim 10, wherein the inter UE coordination information is received via 2nd-stage SCI carried on PSSCH or via a second SL MAC CE.

\* \* \* \* \*